(12) United States Patent
Walker et al.

(10) Patent No.: US 8,781,894 B2
(45) Date of Patent: *Jul. 15, 2014

(54) SYSTEM TO PROVIDE PRICE ADJUSTMENTS BASED ON INDICATED PRODUCT INTEREST

(71) Applicant: Inventor Holdings, LLC, Stamford, CT (US)

(72) Inventors: Jay S. Walker, Ridgefield, CT (US); Keith Bemer, Pittsburgh, PA (US); Timothy A. Palmer, Mountain View, CA (US); Russell P. Sammon, San Francisco, CA (US)

(73) Assignee: Inventor Holdings, LLC, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/909,055

(22) Filed: Jun. 3, 2013

(65) Prior Publication Data

US 2013/0268346 A1 Oct. 10, 2013

Related U.S. Application Data

(63) Continuation of application No. 09/606,364, filed on Jun. 29, 2000, now Pat. No. 8,473,341.

(60) Provisional application No. 60/204,519, filed on May 16, 2000.

(51) Int. Cl.
G06Q 30/02 (2012.01)

(52) U.S. Cl.
USPC ............ 705/14.34; 705/14.46; 705/14.51; 705/14.23; 705/14.1; 705/26.1

(58) Field of Classification Search
USPC .............. 705/14.46, 14.34, 14.51, 14.1, 26.1
See application file for complete search history.

(56) References Cited

U.S. PATENT DOCUMENTS

| 3,573,747 A | 4/1971 | Adams et al. ............... 340/172.5 |
| 4,008,792 A | 2/1977 | Levasseur et al. ............ 194/1 N |

(Continued)

FOREIGN PATENT DOCUMENTS

| EP | 85546 A2 | 1/1983 |
| EP | 0 109 189 A1 | 5/1984 |

(Continued)

OTHER PUBLICATIONS

Kirk, Jim, "Digital Promotions Make Quick Point", The Chicago Tribune, Dec. 26, 1997 at p. N1, 2 pp.

(Continued)

*Primary Examiner* — Mark Fadok
(74) *Attorney, Agent, or Firm* — Fincham Downs, LLC; Carson C.K. Fincham

(57) ABSTRACT

A system to provide price adjustments based on indicated product interest includes reception of an indication from a customer of interest in a first product, reception of an indication from a customer of interest in a second product, determination of a price adjustment for the second product based on the indication of interest in the first product, and transmission of the price adjustment to the customer. By virtue of the foregoing features, a retailer may be willing to provide a price adjustment for the second product which would otherwise not be provided. Moreover, such a price adjustment may incent the customer to purchase the second product in a case that the second product would not otherwise be purchased, thereby potentially increasing a total profit received by the retailer.

13 Claims, 15 Drawing Sheets

(56) References Cited

U.S. PATENT DOCUMENTS

| | | | |
|---|---|---|---|
| 4,108,361 A | 8/1978 | Krause | 235/375 |
| 4,237,537 A | 12/1980 | Pitches et al. | 364/465 |
| 4,245,730 A | 1/1981 | Bachmann et al. | 194/1 A |
| 4,282,575 A | 8/1981 | Hoskinson et al. | 364/479 |
| 4,323,770 A | 4/1982 | Dieulot et al. | 235/375 |
| 4,412,292 A | 10/1983 | Sedam et al. | 364/479 |
| 4,494,197 A | 1/1985 | Troy et al. | 364/412 |
| 4,498,570 A | 2/1985 | King et al. | 194/1 N |
| 4,500,880 A | 2/1985 | Gomersall | |
| 4,593,361 A | 6/1986 | Otten | 364/479 |
| 4,654,800 A | 3/1987 | Hayashi et al. | 364/479 |
| 4,669,730 A | 6/1987 | Small | 273/138 A |
| 4,677,553 A | 6/1987 | Roberts et al. | 364/412 |
| 4,679,150 A | 7/1987 | Hayashi et al. | 364/479 |
| 4,689,742 A | 8/1987 | Troy et al. | 364/412 |
| 4,723,212 A | 2/1988 | Mindrum | 364/401 |
| 4,760,247 A | 7/1988 | Keane et al. | 235/454 |
| 4,766,548 A | 8/1988 | Cedrone et al. | 364/479 |
| 4,815,741 A | 3/1989 | Small | 273/138 A |
| 4,825,045 A | 4/1989 | Humble | 235/383 |
| 4,834,231 A | 5/1989 | Awane et al. | 194/217 |
| 4,839,507 A | 6/1989 | May | 235/375 |
| 4,854,590 A | 8/1989 | Joliff et al. | 273/138 A |
| 4,859,838 A | 8/1989 | Okiharu | 235/383 |
| 4,876,592 A | 10/1989 | Von Kohorn | 358/84 |
| 4,882,473 A | 11/1989 | Bergeron et al. | 235/380 |
| 4,902,880 A | 2/1990 | Garczynski et al. | 235/375 |
| 4,906,828 A | 3/1990 | Halpern | 235/379 |
| 4,908,761 A | 3/1990 | Tai | 364/401 |
| 4,910,672 A | 3/1990 | Off et al. | |
| 4,922,522 A | 5/1990 | Scanlon | 379/95 |
| 4,937,853 A | 6/1990 | Brule et al. | 379/96 |
| 4,973,952 A | 11/1990 | Malec et al. | 340/825.35 |
| 4,982,337 A | 1/1991 | Burr et al. | 364/479 |
| 4,993,714 A | 2/1991 | Golightly | 273/138 A |
| 4,996,642 A | 2/1991 | Hey | |
| 5,025,372 A | 6/1991 | Burton et al. | 364/406 |
| 5,056,019 A | 10/1991 | Schultz et al. | 364/405 |
| 5,091,713 A | 2/1992 | Horne et al. | 340/541 |
| 5,119,295 A | 6/1992 | Kapur | 364/412 |
| 5,128,862 A | 7/1992 | Mueller | 364/405 |
| 5,132,914 A | 7/1992 | Cahlander et al. | 364/478 |
| 5,172,328 A | 12/1992 | Cahlander et al. | 364/478 |
| 5,173,851 A | 12/1992 | Off et al. | |
| 5,177,342 A | 1/1993 | Adams | 235/379 |
| 5,192,854 A | 3/1993 | Counts | 235/375 |
| 5,201,010 A | 4/1993 | Deaton et al. | 382/7 |
| 5,216,595 A | 6/1993 | Protheroe | 364/412 |
| 5,223,698 A | 6/1993 | Kapur | 235/375 |
| 5,231,569 A | 7/1993 | Myatt et al. | 364/408 |
| 5,239,165 A | 8/1993 | Novak | 235/375 |
| 5,243,515 A | 9/1993 | Lee | 364/401 |
| 5,245,533 A | 9/1993 | Marshall | 364/401 |
| 5,250,789 A | 10/1993 | Johnsen | |
| 5,256,863 A | 10/1993 | Ferguson et al. | 235/383 |
| 5,257,179 A | 10/1993 | DeMar | 364/410 |
| 5,262,941 A | 11/1993 | Saladin et al. | 364/408 |
| 5,267,452 A | 12/1993 | Zinsmeyer et al. | 62/505 |
| 5,274,547 A | 12/1993 | Zoffel et al. | 364/408 |
| 5,283,731 A | 2/1994 | Lalonde et al. | 364/401 |
| 5,287,268 A | 2/1994 | McCarthy | 364/405 |
| 5,297,026 A | 3/1994 | Hoffman | 364/408 |
| 5,297,031 A | 3/1994 | Gutterman et al. | 364/408 |
| 5,302,811 A | 4/1994 | Fukatsu | 235/381 |
| 5,305,195 A | 4/1994 | Murphy | 364/401 |
| 5,309,355 A | 5/1994 | Lockwood | 364/401 |
| 5,339,250 A | 8/1994 | Durbin | 364/479 |
| 5,353,218 A | 10/1994 | De Lapa | 364/401 |
| 5,353,219 A | 10/1994 | Mueller et al. | 364/405 |
| 5,367,452 A | 11/1994 | Gallery et al. | 364/401 |
| 5,371,796 A | 12/1994 | Avarne | 380/23 |
| 5,380,991 A | 1/1995 | Valencia et al. | 235/383 |
| RE34,915 E | 4/1995 | Nichtberger et al. | 364/401 |
| 5,420,606 A | 5/1995 | Begum et al. | 345/156 |
| 5,434,394 A | 7/1995 | Roach et al. | 235/375 |
| 5,450,938 A | 9/1995 | Rademacher | 194/206 |
| 5,452,344 A | 9/1995 | Larson | 379/107 |
| 5,459,306 A | 10/1995 | Stein et al. | |
| 5,481,094 A | 1/1996 | Suda | |
| 5,504,475 A | 4/1996 | Houdou et al. | 340/825.35 |
| 5,510,979 A | 4/1996 | Moderi et al. | 364/405 |
| 5,511,646 A | 4/1996 | Maldanis et al. | 194/217 |
| 5,521,364 A | 5/1996 | Kimura et al. | |
| 5,539,189 A | 7/1996 | Wilson | 235/379 |
| 5,564,546 A | 10/1996 | Molbak et al. | 194/216 |
| 5,572,653 A | 11/1996 | DeTemple et al. | 395/501 |
| 5,581,064 A | 12/1996 | Riley et al. | 235/383 |
| 5,592,375 A | 1/1997 | Salmon et al. | 395/207 |
| 5,592,376 A | 1/1997 | Hodroff | 395/214 |
| 5,592,378 A | 1/1997 | Cameron et al. | 395/227 |
| 5,602,377 A | 2/1997 | Beller et al. | 235/462 |
| 5,608,643 A | 3/1997 | Wichter et al. | 364/479.14 |
| 5,611,052 A | 3/1997 | Dykstra et al. | 395/238 |
| 5,612,868 A | 3/1997 | Off et al. | |
| 5,613,620 A | 3/1997 | Center et al. | 221/133 |
| 5,615,269 A | 3/1997 | Micali | 380/49 |
| 5,619,558 A | 4/1997 | Jheeta | 379/90 |
| 5,620,079 A | 4/1997 | Molbak | 194/217 |
| 5,621,201 A | 4/1997 | Langhans et al. | 235/380 |
| 5,621,640 A | 4/1997 | Burke | 395/214 |
| 5,621,812 A | 4/1997 | Deaton et al. | 382/100 |
| 5,632,010 A | 5/1997 | Briechle et al. | 345/1 |
| 5,644,723 A | 7/1997 | Deaton et al. | 394/214 |
| 5,649,114 A | 7/1997 | Deaton et al. | 395/214 |
| 5,652,421 A | 7/1997 | Veeneman et al. | 235/381 |
| 5,655,007 A | 8/1997 | McAllister | 379/91.01 |
| 5,664,115 A | 9/1997 | Fraser | 705/37 |
| 5,665,953 A | 9/1997 | Mazzamuto et al. | 235/383 |
| 5,671,276 A | 9/1997 | Eyer et al. | |
| 5,687,322 A | 11/1997 | Deaton et al. | |
| 5,701,252 A | 12/1997 | Facchin et al. | 364/479 |
| 5,710,886 A | 1/1998 | Christensen et al. | |
| 5,710,887 A | 1/1998 | Chelliah et al. | |
| 5,724,886 A | 3/1998 | Ewald et al. | 99/374 |
| 5,732,398 A | 3/1998 | Tagawa | 705/5 |
| 5,734,150 A | 3/1998 | Brown et al. | 235/381 |
| 5,749,081 A | 5/1998 | Whitels | |
| 5,774,868 A | 6/1998 | Cragun | 705/10 |
| 5,774,869 A | 6/1998 | Toader | |
| 5,791,991 A | 8/1998 | Small | |
| 5,806,045 A | 9/1998 | Biorge et al. | |
| 5,809,144 A | 9/1998 | Sirbu et al. | |
| 5,816,918 A | 10/1998 | Kelly et al. | |
| 5,822,735 A | 10/1998 | De Lapa et al. | |
| 5,822,736 A | 10/1998 | Hartman et al. | |
| 5,832,496 A | 11/1998 | Anand et al. | |
| 5,835,087 A | 11/1998 | Herz et al. | |
| 5,842,178 A | 11/1998 | Giovannoli | |
| 5,844,808 A | 12/1998 | Konsmo et al. | 364/479.14 |
| 5,845,259 A | 12/1998 | West et al. | 705/14 |
| 5,848,396 A | 12/1998 | Gerace | |
| 5,855,007 A | 12/1998 | Jovicic et al. | |
| 5,857,175 A | 1/1999 | Day et al. | |
| 5,859,414 A | 1/1999 | Grimes et al. | |
| 5,864,822 A | 1/1999 | Baker, III | |
| 5,873,069 A | 2/1999 | Reuhl et al. | 705/20 |
| 5,878,401 A | 3/1999 | Joseph | |
| 5,890,718 A | 4/1999 | Byon | 273/459 |
| 5,897,622 A | 4/1999 | Blinn et al. | 705/26 |
| 5,918,211 A * | 6/1999 | Sloane | 705/16 |
| 5,918,213 A | 6/1999 | Bernard et al. | 705/26 |
| 5,930,145 A | 7/1999 | Yuyama et al. | 364/479.01 |
| 5,933,813 A | 8/1999 | Teicher et al. | 705/26 |
| 5,946,665 A | 8/1999 | Suzuki et al. | 705/26 |
| 5,948,040 A | 9/1999 | DeLorme et al. | |
| 5,974,399 A * | 10/1999 | Giuliani et al. | 705/14.25 |
| 5,979,757 A | 11/1999 | Tracy et al. | |
| 5,997,928 A | 12/1999 | Kaish et al. | 426/418 |
| 5,999,914 A | 12/1999 | Blinn et al. | |
| 6,012,834 A | 1/2000 | Dueck et al. | 364/479.08 |
| 6,014,634 A | 1/2000 | Scroggie et al. | 705/14 |
| 6,021,394 A | 2/2000 | Takahashi | 705/10 |
| 6,026,370 A | 2/2000 | Jermyn | 705/14 |
| 6,049,777 A | 4/2000 | Sheena et al. | 705/10 |

(56) References Cited

U.S. PATENT DOCUMENTS

| | | | |
|---|---|---|---|
| 6,064,987 A | 5/2000 | Walker et al. | 705/38 |
| 6,070,147 A | 5/2000 | Harms et al. | 705/14 |
| 6,088,682 A | 7/2000 | Burke | 705/17 |
| 6,112,191 A | 8/2000 | Burke | 705/41 |
| 6,138,105 A | 10/2000 | Walker et al. | 705/10 |
| 6,223,163 B1 | 4/2001 | Van Luchene | 705/1 |
| 6,267,670 B1 | 7/2001 | Walker et al. | 463/17 |
| 6,298,329 B1 | 10/2001 | Walker et al. | 705/14 |
| 6,298,331 B1 | 10/2001 | Walker et al. | 705/15 |
| 6,332,126 B1 | 12/2001 | Peirce et al. | 705/14 |
| 6,332,128 B1 * | 12/2001 | Nicholson | 705/14.26 |
| 6,397,193 B1 | 5/2002 | Walker et al. | 705/16 |
| 6,434,530 B1 * | 8/2002 | Sloane et al. | 705/26.62 |
| 6,539,393 B1 | 3/2003 | Kabala | |
| 6,778,967 B1 * | 8/2004 | Nicholson | 705/14.38 |
| 6,820,062 B1 | 11/2004 | Gupta et al. | |
| 7,024,373 B1 | 4/2006 | Reynolds et al. | |
| 2013/0035984 A1 * | 2/2013 | Davis et al. | 705/7.29 |

FOREIGN PATENT DOCUMENTS

| | | |
|---|---|---|
| EP | 512413 | 11/1992 |
| EP | WO 97/35441 | 9/1997 |
| EP | WO 97/46961 | 12/1997 |
| EP | WO 97/50064 | 12/1997 |
| EP | 0 817 138 A1 | 1/1998 |
| JP | 58132886 | 8/1983 |
| JP | 2001093 A | 1/1990 |
| JP | 2208798 A | 8/1990 |
| JP | 4235700 A | 8/1992 |
| JP | 5242363 A | 9/1993 |
| JP | 7065218 A | 3/1995 |
| JP | 8030848 A | 2/1996 |
| JP | 8-147545 | 6/1996 |
| JP | 8221645 A | 8/1996 |
| JP | 8329323 A | 12/1996 |
| JP | 9016836 A | 1/1997 |
| JP | 9062908 A | 3/1997 |
| KR | 9503826 | 4/1995 |
| WO | WO 96/36926 | 11/1996 |
| WO | WO 97/24701 | 7/1997 |
| WO | WO 97/28510 | 8/1997 |

OTHER PUBLICATIONS

"Cape Town", Reuters Ltd., Reuters, Nov. 8, 1979, 1 pg.
"Save the Mark", The Financial Times Limited, Feb. 1, 1983, 1 pg.
Cook, Louise, "ConsumerWatch: Clip, Snip, Save", The Associated Press, Mar. 12, 1984, Business News Section, 2 pp.
"POS Spectrum: A Lottery Looks to POS for Growth", UMI, Inc.; Banking Information Source, POS News Jan. 1989,, vol. 5, No. 7, p. 8, 1 pg.
Kuttner, Robert, "Computers May Turn the World Into One Big Commodities Pit", Business Week, Sep. 11, 1989, Economic Viewpoint Section at p. 17, 2 pp.
Schrage, Michael, "An Experiment in Economic Theory: Labs Testing Real Markets", The Record, Nov. 26, 1989, Sunday, All Editions, Business Section at p. B1, 3 pp.
"Let's Play the Cash Register Receipts Lottery", New York Times Company, Dec. 25, 1990, Section 1, p. 30, col. 4, Editorial Desk, 1 pg.
Del Rosso, Laura, "Marketel Says it Plans to Launch Air Fare 'Auction' in June", Travel Weekly, Apr. 29, 1991, vol. 50, No. 34 at p. 1, 4 pp.
Author Unknown, "Philips Offers Customers Financing Through Citicorp; Philips Medical Systems North America, Citicorp North America, Inc.", Health Industry Today, Jun. 1991, vol. 54, No. 6; ISSN: 0745-4678 at p. 4, 1 pg.
Pelline, Jeff, "Travelers Bidding on Airline Tickets SF Firm Offers Chance for Cut-rate Fares", The San Francisco Chronicle, Aug. 19, 1991, Monday Final Edition at p. A4, 3 pp.
Del Rosso, Laura, "Ticket-bidding Firm Closes Its Doors; Marketel International; Brief Article", Travel Weekly, Mar. 12, 1992, vol. 51; No. 21; ISSN: 0041-2082 at p. 1, 2 pp.

Information Access Company, A Thompson Corporation Company ASAP, "Coupons Get Serious; Supermarkets Use Barcodes to Prevent Misredemptions", Copyright 1992, 2 pp.
"Winn-Dixie/The Salvation Army Report Contributions for War Against Hunger", PR Newswire Association, Inc., Jun. 10, 1993, 1 pg.
Jones, Jeanne, "Date Readers Streamline Management: Scanner Technology Aids Retailers as Well as Plants, Wholesalers", The Houston Post, Jun. 26, 1994, 4 pp.
Fiorini, Phillip, "No Place for Penny? Smallest Coin Doesn't Make Cents to Some", USA Today, Jul. 1994, Final Edition at p. 1A, 3 pp.
Smith, Alison, "Survey of UK Consumer Credit and Asset Finance", Financial Times, Nov. 3, 1994 at p. V1, 3 pp.
Andreoli, Tom; Bordon, Jeff; Healy, Beth; Strahler, Steven R., and Veverka, Mark, "Cash Machines Offer a Whole Lotto Money for Withdrawl; An Unfortunate Juxtaposition; Block That Metaphor!, Something Street Talk; Fishy in Springfield; State Street Sears?; Champion as Underdog; A 'Whole Language' Graduate", Crain's Chicago Business, Jun. 19, 1995, News Section at p. 8, 2 pp.
"Spain: BBV Launches New Card", Cards International, Jun. 22, 1995 at p. 5, 1 pg.
Knippenberg, Jim, "Psst! Will Local Radio Empires Strike Back?", Copyright 1995, The Cincinnati Enquirer, Jul. 23, 1995, 1 pg.
Brochure: "Cyber Bid", Net Fun, Ltd., Copyright 1996 and 1995, 9 pp.
Hadley, Kimberly, "Pastors Praying Anti-Arson Effort Will Burn Bias", Copyright 1996, Nashville Banner, 1 pg.
Gapper, John, "NatWest Reports Rise in Bad Debt", Financial Times, Jul. 31, 1996, London Edition 3, News: UK Section at p. 9, 1 pg.
Author Unknown, "Lynx Technology: Lynx to Provide Business Leasing Programme Through Schroder Leasing", M2 Presswire, Aug. 9, 1996, 2 pp.
Taylor, Paul, "Towards a Dream Market", Financial Times (London) Sep. 4, 1996 at p. 3, 2 pp.
Bonnici, Joseph; Campbell, David P.; Fredenberger, William B.; and Hunnicutt, Kathryn, H., "Consumer Issues in Coupon Usage: An Exploratory Analysis", Winter 1996/1997, 11 pp.
Singletary, Michelle, "Electronic World, Unchecked Problem? U.S. Move to Paperless Payment Raises Worries About Those Who Don't Use Banks", The Washington Post, Mar. 4, 1997, Final Edition Financial Section at p. C01, 2 pp.
Avco Financial Services, "National Home Furnishing Association", (http://www.homefurnish.com/NHFA/avco.htm), download date: May 23, 1997, 2 pp.
"Products and Services: Checkout Direct", Catalina Marketing Corporation, (http://catalinamktg.com/prodcdir.htm), download date: May 29, 1997, 12 pp.
Nairn, Geoff, "The Key to Your Identity: Falling Costs Will Allow Fingerprint Verification to be Widely Used, Reports Geoff Nairn", Financial Times (London), Jul. 15, 1997, Technology Section at p. 12, 3 pp.
The United Computer Exchange, "How It All Works", The United Computer Exchange Corporation, (http://www.uce.comhowitiworks.htm), download date: Jul. 23, 1997, 5 pp.
"Classifieds2000: The Internet Classified", Classified2000, (http://www.classifieds2000.com/cgi-cls/Display.exe?C2K+aboutus), download date: Aug. 6, 1997, 3 pp.
"General Trading Floor Information and Terms Provided by Tradingfloor.com", (http://tradingfloor.com/info.htm), download date: Aug. 14, 1997, 11 pp.
"NASDAQ: What is Nasdq?" Information Sheet, (http://home.axford.com/corfin/corfl1.htm), download date: Aug. 15, 1997, 7 pp.
Prochaska,-Cue, Kathy, "Acquiring Credit", (http://ianr.www.unl.edu/IANR/PBUBS/NEBFACTS/NF91-2.htm), download date: Sep. 3, 1997, 4 pp.
"About IAO", Interactive Auction Online, (http://www.iaoauction.com/about.htm), download date: Sep. 8, 1997, 10 pp.
Kelsey, John; Schneier, Bruce, "Conditional Purchase Orders", Fourth ACM Conference on Computer Communication Security, Apr. 1997, ACM Press at p. 117-124, 8 pp.
PR Newswire Association, Inc., "Progressive Introduces Kitchen Display System (KDS) for Restaurants", Financial News Section, Jan. 23, 1998, 1 pg.

(56) References Cited

OTHER PUBLICATIONS

Blair, Adam, "JICC Coupon Guide Recommends Upgrade at Front End", Information Access Company, Supermarket News, p. 23; ISSN: 0039-5803, 2 pp.

Advanced Mechanics, "Advanced Mechanics Internet Specials", (http://www.metroplexweb.com/advcpn2.htm), download date: Mar. 12, 1998, 4 pp.

Uniform Code Council, Inc., "U.P.C. Coupon Code Guidelines Manual", (http://www.uc-council.org/d31-3.htm), download date: Mar. 12, 1998, 10 pp.

Hamstra, Mark, "Segment Study: 'Made-for-you' Maneuvers Signal Competitive Shift in QSR Category", Segment Study Quick Serve, Apr. 13, 1998, 3 pp.

Welbilt, "It's in the Bag. Introducing the Universal Holding Cabinet from Welbilt", 1990, The Frymaster Corporation, 5 pp.

H&K Dallas Inc., "Universal Holding Cabinet Rollout Program", Winter 1998, 6 pp.

"NCR 7453 PC-Based Point-of-Sale Solutions", 1998 NCR Corporation, 2 pp.

"POSitive Input", Spring/Summer Edition, The McDonald's POS-3 System Newsletter from Olivetti Solutions/OLSY, 8 pp.

Promotion Times, An SCA Quarterly Newletter—First Quarter, "'New Wave Marketing'", Apr. 1998, 2 pp.

Wakefern Food Corporation, Corporate Merchandising, "5 Weeks of Coupon Values for a Valuable Customer!", Copyright: Wakefern Food Corporation, 1998, 1 pg.

Technologies, Inc., "Introducing the Digital MenuBoard", (www.sirentech.com), 4 pp.

Olivetti, "For the Crew & the Customer, The Best Drive-Thru & Grill Service", Winter 1998, 2 pp.

Rehayem, Gilbert, "Opinion: X-Press Betting", LaFleur's Lottery World, 1 pg.

Garry, Michael, "Oh Baby!", Progressive Grocer, Jul. 1995, pp. 39 and 42, 2 pp.

Greene, Jan, "Farm Bills Please Assns; National Grocers Association", Capital Cities Media, Inc., Dec. 23, 1985, vol. 35 at p. 6, ISSN: 0039-5803, 1 pg.

Riordan, Theresa, "Patents: A Novel Approach to Making a Better Spermicide Harks Back to Some Old-Fashioned Methods", The New York Times, Jun. 9, 1997, Section D at p. 2, 3 pp.

"Welcome to Onsale: Auction Supersite", (http://www.onsale.com.category/category/inv/00124972.htm), download date: Sep. 8, 1997, 15 pp.

Mulher, F.J. et al., "Implicit Price Bundling of Retail Products: A Multiproduct Approach to Maximizing Store Profitability", Journal of Marketing, vol. 55, Issue 4, pp. 1-22, Oct. 1991, 22 pp.

Anonymous, "The Dynamics of Micromarketing: Pinpointing Your Customers", Abstract, Progressive Grocer, vol. 73, Oct. 1994, 1 pg.

Brochure: "Reaching Out in New Directions", First Data Corporation, Merchant Services, undated, 31 pp.

Nakayama, Atsushi, "Coca-Cola Machines to be 'smarter'", The Japan Economic Journal, Feb. 23, 1991, Section: Industry: Chemicals, p. 22, 2 pp.

Gilbert, Allan Z., "Operators Can Gain With Creative Merchandising", Automatic Merchandiser, Oct. 1992, p. 80, ISSN: 1061-1797, 3 pp.

"NCR 7452 Workstation—Beyond Traditional POS", NCR Corporation, Copyright 1996 (http://ncr.com/products/retail/products/catalog/7452.shtm), 3 pp.

Maras, Elliot, "Software Opens Doors to Scientific Machine Menuing", Automatic Merchandiser, Feb. 1996, Section: p. 36, ISSN: 0002-7545, 5 pp.

McKinney, Jeff, "Merchant Program Could Pay Off for Provident", The Cincinnati Enquirer, Mar. 24, 1996, Section: Financial, p. E02, 2 pp.

Gilbert, Allan Z., "A Call to Action for Wireless Data Communication", Automatic Merchandiser, Aug. 1996, Section: Financial Management, 3 pp.

"Public Internet Kiosks, Inc. Receives First Order for It's 'Internet Station'", PR Newswire Association, Inc., Sep. 16, 1996, 2 pp.

"Bigger Plans", Card Fax, Oct. 1996, Section: vol. 96, No. 178, p. 2, 1 pg.

Fickenscher, Lisa, "Amex to Start Free Rewards Program with Discounts on Merchandise", The American Banker, Oct. 18, 1996, Section: Credit/Debit/ATMs, p. 10, 2 pp.

Fitzgerald, Kate, "Amex Program Moves Loyalty to Next Level: Custom Extras Find a Medium Customers Can't Ignore: Billing Statements", Advertising Age, Nov. 4, 1996, Section: News, p. 2, 2 pp.

Quittner, Jeremy, "Ohio's Provident Brings Its Discounts Card to Fla.", The American Banker, Feb. 11, 1997, Section: Credit/Debit/ATMs, p. 11, 2 pp.

Symons, Allene, "Lucky, Say-On Debuts Rewards Cards", Drug Store News, Feb. 17, 1997, p. 3, 2 pp.

McKeveny, Alexander, "Giving Them a Good Reason", Bank Marketing, Mar. 1997, Section: vol. 29, No. 3, pp. 37-40, ISSN: 0888-3149, CODEN:ERKCDK, 5 pp.

Fickenscher, Lisa, "Merchant: American Express Seeks to Mine Its Data on Cardholder Spending Patterns", The American Banker, Mar. 24, 1997, Section: Credit/Debit/ATMs, p. 20, 2 pp.

French, Simone et al., "A Pricing Strategy to Promote Low-Fat Snack Choices Through Vending Machines", American Journal of Public Health, May 1997, vol. 87, No. 5, pp. 849-851, 3 pp.

"Dispensing the Future", Electronic Payments International, May 1997, Section: Feature, p. 12, 5 pp.

"Industry Briefs", Card News, Jun. 9, 1997, Section: vol. 12, No. 11, 2 pp.

Hoeschen, Brad, "Brookfield Square Hopes Mall Card Strikes a Chord", Business Journal-Milwaukee, Sep. 12, 1997, Section: vol. 14, No. 50, p. 19, 2 pp.

Website: "VendMaster News", (http://www.vendmaster.com/news/main.html), download date: Feb. 6, 1998, 10 pp.

Website: "VendMaster—Reports", (http://vendmaster.com/reports_main.html), download date: Feb. 6, 1998, 13 pp.

Salinger, Michael A., "A Graphical Analysis of Bundling", Journal of Business, vol. 68, No. 1, pp. 85-98, 1995, 10 pp.

Matutes, Carmen; Regibeau, Pierre, "Compatibility and Bundling of Complementary Goods in a Duopoly; Symposium on Compatibility", The Journal of Industrial Economics, vol. XL, No. 1, pp. 37-54, Mar. 1992, 14 pp.

Schrage, Michael, "Free Stuff! Predatory Pricing or Creative Cross-Promotion? You Be the Judge; The Beta Version; Industry Trend or Event; Column" Marketing Computers, Oct. 1995, No. 9, vol. 15, p. 24, 2 pp.

Website: "Verbind Technology", Verbind, Inc. (http://www.verbind.com/tech.html), download date: Jul. 30, 1999.

Website: "Net Perceptions" (http://www.netperceptiojns.com/company/indexB.html), download date: Aug. 2, 1999, 4 pp.

Alba, Joseph; Lynch, John; Janiszewski, Chris; et al., "Interactive Home Shopping: Consumer Retailer and Manufacturer Incentives to Participate in Electronic Marketplaces", Journal of Marketing, Chicago: Jul. 1997, 20 pp.

Livingston, Kimball, "In-Store Systems—VideOcart Redux", RT Magazine, Mar. 1998, 1 pg.

Tice, Carol, "Web Ordering May Alter Role of Distributors", Jun. 22, 1998, National Home Center News, download date: Jul. 1, 2003, 6 pp.

Office Action for U.S. Appl. No. 09/085,424, dated Jun. 10, 1999, 5 pp.

Notice of Allowability for U.S. Appl. No. 09/0885,424 dated Feb. 11, 2000, 4 pp.

Office Action for U.S. Appl. No. 09/571,210 dated Apr. 23, 2001, 14 pp.

Office Action (Interview Summary) for U.S. Appl. No. 09/571,210, dated Jul. 25, 2001, 4 pp.

Office Action for U.S. Appl. No. 09/571,210 dated Oct. 10, 2001, 10 pp.

Notice of Allowability for U.S. Appl. No. 09/571,210 dated Apr. 16, 2002, 4 pp.

Notice of Allowability for U.S. Appl. No. 09/571,210 dated Mar. 3, 2003, 5 pp.

Office Action for U.S. Appl. No. 09/360,422 dated Feb. 13, 2002, 12 pp.

(56) References Cited

OTHER PUBLICATIONS

Office Action for U.S. Appl. No. 09/360,422 dated Aug. 19, 2002, 16 pp.
Office Action for U.S. Appl. No. 09/360,422 dated May 5, 2003, 24 pp.
Office Action for U.S. Appl. No. 09/360,422 dated Oct. 22, 2003, 8 pp.
Office Action for U.S. Appl. No. 09/360,422 dated Aug. 4, 2004, 2 pp.
Office Action for U.S. Appl. No. 09/360,422 dated Nov. 17, 2004, 16 pp.
Office Action for U.S. Appl. No. 09/360,422, dated May 10, 2005, 3 pp.
Office Action for U.S. Appl. No. 09/360,422 dated Feb. 3, 2006, 50 pp.
Notice of Allowance for U.S. Appl. No. 09/606,364 dated Feb. 22, 2013, 19 pp.
Decision on Appeal Office for U.S. Appl. No. 09/606,364 dated Dec. 6, 2012, 7 pp.
Office Action for U.S. Appl. No. 09/606,364 dated Apr. 19, 2010, 16 pp.
Office Action for U.S. Appl. No. 09/606,364 dated Feb. 21, 2008, 9 pp.
Office Action for U.S. Appl. No. 09/606,364 dated Sep. 21, 2007, 12 pp.
Office Action for U.S. Appl. No. 09/606,364 dated Jan. 31, 2007, 7 pp.
Office Action for U.S. Appl. No. 09/606,364 dated Jul. 22, 2005, 18 pp.
Office Action for U.S. Appl. No. 09/606,364 dated Oct. 7, 2004, 20 pp.
Office Action for U.S. Appl. No. 09/606,364 dated Aug. 20, 2003, 8 pp.
Notice of Allowance for U.S. Appl. No. 09/360,422 dated Oct. 22, 2010, 7 pp.
Office Action for U.S. Appl. No. 09/360,422 dated Jun. 24, 2010, 46 pp.
Office Action for U.S. Appl. No. 09/360,422 dated Aug. 11, 2008, 45 pp.
Notice of Allowance for U.S. Appl. No. 13/025,814 dated May 2, 2012, 9 pp.
Office Action Notice for U.S. Appl. No. 13/025,814 dated Oct. 31, 2011, 12 pp.
Dalton, Gregory, "As the technology to gather customer data online gets more sophisticated, businesses walk a tightrope between use and abuse." Information Week, N727, Mar. 20, 1999, 4 pp.
Sachez, Marcos, "Move Over Content, Context is King." Business and Management Practices, Mar. 13, 2000, 3 pp.
"Trilogy Dynamic Pricing Solutions." Trilogy™ Enterprise Class E-Business Solutions, http://www.trilogy.com, download date May 2, 2000, 1 pg.
"PriceBreak Product Description." Triangle Research Inc., http://www.triangleresearch.com download date May 2, 2000, 2 pp.
"Mercantec E-Commerce Solutions . . . " http://www.mercnatec.com, download date May 2, 2000, 1 pg.

\* cited by examiner

| PRODUCT IDENTIFIER 610 | PRODUCT DESCRIPTION 620 | RETAIL PRICE 630 | COST 640 | AMOUNT IN INVENTORY 650 | MINIMUM SALE PRICE 660 |
|---|---|---|---|---|---|
| P-10596 | D-BRAND 400MHZ PENTIUM III COMPUTER SYSTEM | $1000.00 | $700.00 | 15 | $600.00 |
| P-39621 | FICTION NOVEL (G-AUTHOR) | $11.00 | $6.00 | 100 | --- |
| P-96832 | L-BRAND INKJET PRINTER | $200.00 | $80.00 | 30 | $100.00 |
| P-55667 | FICTION NOVEL (G-AUTHOR) | $11.00 | $6.00 | 1 | --- |
| P-12457 | S-BRAND 35" COLOR TELEVISION | $400.00 | $350.00 | 10 | $350.00 |

SYSTEM TO PROVIDE PRICE ADJUSTMENTS BASED ON INDICATED PRODUCT INTEREST

CROSS-REFERENCE TO RELATED APPLICATIONS

This application claims benefit under 35 U.S.C. §120(a) to, and is a continuation of, U.S. patent application Ser. No. 09/606,364, filed Jun. 29, 2000 titled "METHOD AND APPARATUS FOR ADJUSTING PRICES ASSOCIATED WITH PRODUCTS", issued as U.S. Pat. No. 8,473,341 on Jun. 25, 2013, which itself claims the benefit of U.S. Provisional Patent Application No. 60/204,519, filed May 16, 2000 the contents of each application hereby being incorporated by reference herein for all purposes.

This application is also related to (i) U.S. patent application Ser. No. 09/085,424, filed May 27, 1998 and issued as U.S. Pat. No. 6,138,105 on Oct. 24, 2000, titled "SYSTEM AND METHOD FOR DYNAMIC ASSEMBLY OF PACKAGES IN RETAIL ENVIRONMENTS", and (ii) U.S. patent application Ser. No. 09/360,422, filed Jul. 23, 1999 and issued as U.S. Pat. No. 7,899,710 on Mar. 1, 2011, titled "DETERMINATION AND PRESENTATION OF PACKAGE PRICING OFFERS IN RESPONSE TO CUSTOMER INTEREST IN A PRODUCT", the contents of which are incorporated by reference herein for all purposes.

BACKGROUND OF THE INVENTION

The present invention relates to systems for selling products to customers. More specifically, the present invention concerns a system to determine, transmit and provide a price adjustment for a product based on expressed interest in other products.

Competition for customers in retail markets is fierce. As a result, retailers are constantly evaluating and executing various methods designed to attract customers. According to one method, a retailer operating a retail store discounts prices on some products in order to encourage customers to visit the retail store and to purchase other products for non-discounted prices.

An ability of a retailer to attract customers with a discounted price is typically related to a size of a discount reflected in the discounted price. However, selling a product for a price reflecting a large discount often results in a net loss for the retailer, since the discounted price is often less than a cost of the product to the retailer. Therefore, large discounts on prices of products may not prove beneficial to retailers unless customers who purchase the products also purchase other products for non-discounted prices. Since retailers are not assured that other products will be purchased along with the discounted products, retailers are hesitant to provide large discounts. Consequently, traditional discounting is limited in its ability to attract customers.

U.S. Pat. Nos. 5,612,868 and 5,173,851 to Off et al. describe systems in which a coupon for a first product is provided to a customer upon purchase of a second product. The first product is selected based on a stored relationship indicating that a customer purchasing the second product may also desire the first product. Several factors reduce the attractiveness of these systems to customers. For example, a customer who has selected products to purchase and has approached a checkout area with the selected products will often be reluctant to add a product to the selected products. Also, potential customers possess highly varied tastes and needs. Therefore, it is unlikely that many customers will desire a first product which is selected based simply on a stored relationship with a second product.

Each of the related U.S. Patent Applications listed above describes systems designed to address the foregoing problems. For example, U.S. patent application Ser. No. 09/085,424 describes a system in which, in one embodiment, "packages" of several products are created based on factors such as whether the products are complementary, inventory levels, relative product margins, revenue management principles, or the like. Using the same or additional factors, the system determines a package price for which to offer the several products comprising the package. Typically, the package price is less than the sum of the retail prices of each of the several products.

According to one embodiment of U.S. patent application Ser. No. 09/360,422, an indication of interest in a primary product is received from a customer, and a secondary product is identified based on the primary product and factors such as purchasing history of the customer, previous interest indicated by the customer, stored associations of complementary products, retail profit margins of the primary product and the secondary product, or the like. Finally, the primary product and the secondary product are offered to the customer for a package price which is less than a sum of the retail prices of the primary product and the secondary product.

Since the systems of the foregoing U.S. Patent Applications allow a retailer to offset a loss in profit margin from a sale of one product with a gain in profit margin from a sale of another product, a retailer is more willing to deeply discount a retail price of one of the offered products. As a result, an ability of the retailer to attract customers is greater than that offered by conventional discounting techniques.

However, the above-described systems fail to attract certain customers to a retail store regardless of the size of an offered discount because these customers are simply not interested in the second product. Since these customers will not experience any discount, these customers are not encouraged to visit the retail store. Accordingly, what is needed is a system for discounting prices which does not erode profit margins to the extent of conventional discounting systems and which is more attractive to customers than other contemplated systems.

SUMMARY OF THE INVENTION

The present invention addresses the foregoing by, in one aspect, including reception of an indication from a customer of interest in a first product, reception of an indication of interest in a second product, determination of a price adjustment for the second product based on the indication of interest in the first product, and transmission of the price adjustment to the customer. By virtue of the foregoing features, a customer is presented with an opportunity to receive a price adjustment for a product in which he is interested. Therefore, the customer may be incented to purchase the second product in a case where he would not otherwise purchase the second product. Moreover, the retailer is willing to provide a price adjustment for the second product which would otherwise not be provided because of the indicated interest in the first product, which suggests that the retailer may receive a profit from a sale of the first product.

In an additional aspect, also transmitted with the price adjustment is an indication that the customer will be charged a price for the second product according to the price adjustment only if the first product is purchased. Such a feature provides extra incentive for the customer to purchase both the first product and the second product. Since the retailer is assured that the price adjustment will be applied only if the first product is purchased (and the retail profit margin of the first product is received), the retailer may be more willing to transmit a price adjustment reflecting a significant discount in the sale price of the second product.

An additional aspect of the invention includes a determination of whether the customer is purchasing the first product, a sale of the second product to the customer for a sale price based on the price adjustment if it is determined that the customer is purchasing the first product, and a sale of the second product to the customer for a retail price if it is determined that the customer is not purchasing the first product. This aspect provides further features for assuring the retailer that the customer will be charged in accordance with the price adjustment for the second product only if the first product is purchased, and thereby also assuring the retailer that the retail profit margin of the second product will not be sacrificed without receiving some benefit in return.

Other aspects further increase the attractiveness of the price adjustment by including transmission of a retail price of the second product along with the price adjustment. As a result, a customer is able to determine easily an extent of a discount reflected in the price adjustment.

In further aspects, the price adjustment is determined based on revenue management information related to the first product and to the second product in order to ensure that a profit obtained through a sale of the first product and the second product for a price reflecting the price adjustment is acceptable to the retailer. In some cases, such a profit is greater than that obtainable through a sale of the first product alone.

In another aspect, the present invention includes indication of an interest in a product and reception of a price adjustment for the product, wherein the price adjustment is determined based on the interest in a first product and is different from another price adjustment for the product received in a case that no interest in the first product is indicated. According to yet another aspect, the present invention includes indication of an interest in a product, and reception of a price adjustment for the product, wherein the price adjustment is a first price adjustment if the customer has previously indicated an interest in a first product and is a second price adjustment if the customer has not previously indicated an interest in the first product. By virtue of each of the previous two aspects, price adjustments for a product may be varied depending upon a customer's expressed interest in other products.

In further aspects, the present invention concerns identification of a product to be purchased by a customer, determination of whether the product is associated with a price adjustment transmitted to the customer and determined based on an indication of interest from the customer in a first product, and determination of whether the first product is being (or has been) purchased by the customer, and, if it is determined that the first product is being (or has been) purchased by the customer, charging the customer a price for the product based on the price adjustment. The foregoing features allow a retailer to offer significant price adjustments to attract customers, since the price adjustment is provided only if a purchase of the first product is assured. Purchase of the first product may be desired by the retailer to ensure reception of a retail profit margin of the first product, to ensure disposal of excess inventory of the first product, or for other reasons.

According to another aspect, the invention relates to an apparatus including means for obtaining an indication from a customer of interest in a first product, means for obtaining an indication from the customer of interest in a second product, means for producing a price adjustment for the second product based on the indication of interest in the first product, and means for transmitting the price adjustment to the customer.

With these and other advantages and features of the invention that will become hereinafter apparent, the nature of the invention may be more clearly understood by reference to the following detailed description, the appended claims, and to the several drawings attached hereto.

BRIEF DESCRIPTION OF THE DRAWINGS

FIG. 6 illustrates a tabular representation of a portion of a product database according to one embodiment of the present invention;

DETAILED DESCRIPTION

Figure 1A:
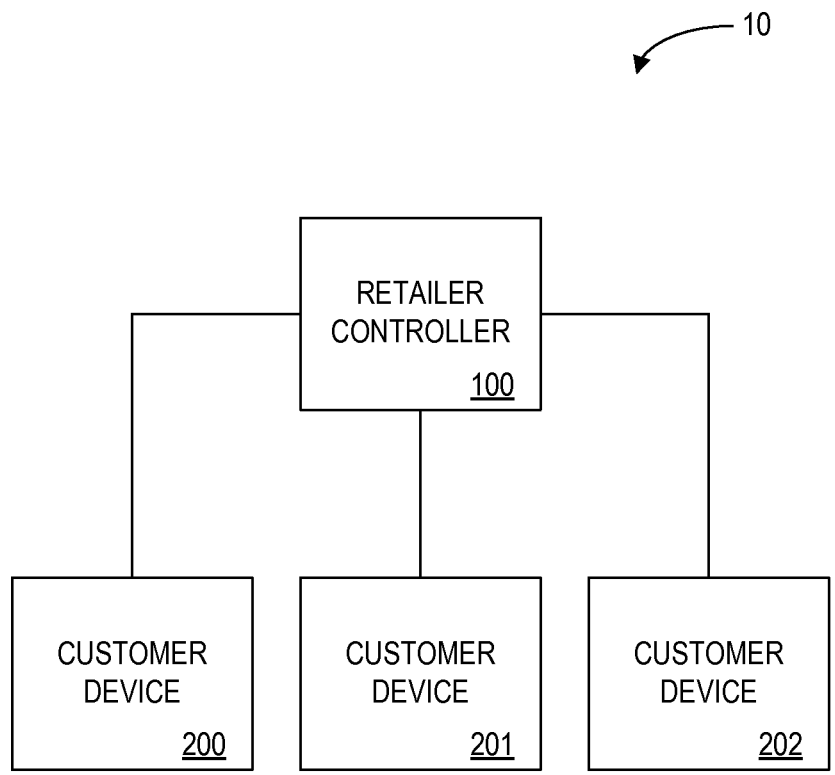
FIG. 1A is a block diagram of a system according to one embodiment of the present invention.

To insure clarity of the following description, set forth below are definitions of several terms used herein. The scope of the present invention is not to be deemed limited by the definitions.

Price Adjustment: A value used to determine a sale price of at least one product. Types of price adjustments include prices ($100.00), price discount values ($10 off a retail price), and percentage discount values (10% off a retail price). It should be noted that price discount values and percentage discount values may be defined in terms of prices other than a retail price.

Product: A good or service. The term product may also be used herein to refer to one or more related or unrelated goods and/or services.

Retailer: An entity which sells products to customers. Such entities include proprietors of traditional retail stores, proprietors of online retail stores, product manufacturers, product warehousers, telemarketers, mail-order services, and online storefront providers.

Retail Price: A price for which a product is sold to customers absent a price adjustment.

Retail Profit Margin: A profit received by a retailer through sale of a product for a retail price. A retail profit margin may be calculated by subtracting a product's cost from the product's retail price.

Retail Store: Generally, a location at which products are offered for sale by a retailer. Traditionally, a retail store is a physical building in which a retailer offers and sells products to customers. Retail stores also include websites in which descriptions and visual representations of products for sale may be viewed by customers and through which the customers may purchase one or more of the products for sale.

Sale Price: A price which a customer pays in exchange for a product. Sale prices include retail prices and prices adjusted according to price adjustments.

As a brief introduction to the following detailed description, one specific embodiment of the present invention is now described. According to this embodiment, a customer executes a web browser on a personal computer and enters into the web browser a uniform resource locator (URL) corresponding to a website operated by a product retailer. The URL is sent over the World Wide Web to an appropriate web server located in a retailer controller and, in response, the web server delivers a web page to the web browser, which displays the web page on the personal computer. The customer then navigates through various web pages of the website using the web browser in order to shop for products.

In this embodiment, one web page contains a list of hyperlinks, with each hyperlink being associated with a particular product. Accordingly, upon selecting one of the hyperlinks, the web browser receives and displays a web page containing a view, a description, and a retail price of an associated first product. The customer indicates an interest in the first product by selecting an "add to cart" icon displayed on the web page. As a result, the retailer controller records that the customer has indicated an interest in the first product. Next, the customer selects a hyperlink associated with a second product.

Based on the indicated interest in the first product, the retailer controller determines a price adjustment for the second product. In this example, the price adjustment is a discounted price which is less than a retail price for which the second product would be sold absent the indicated interest in the first product. A web page corresponding to the second product is then transmitted to the web browser, the web page including the price adjustment and a view, a description, and the retail price of the second product. The web page also specifies to the customer that the second product will be sold in accordance with the price adjustment only if the customer also purchases the first product.

The customer continues adding products to his "cart" in order to designate those products for purchase. The customer then selects a displayed "checkout" icon to indicate a desire to purchase the products currently in the cart. In response, the customer is charged according to price adjustments for those products in the cart which are associated with price adjustments and for which required products are also being purchased, and is charged a retail price for all other products in the cart. For example, the customer is charged for the second product according to the price adjustment if the first product is being purchased, and is otherwise charged the retail price for the second product.

It should be noted that the foregoing merely describes one particular embodiment of the invention, and that the invention should not be deemed limited to the particular aspects mentioned above.

FIG. 1A shows a block diagram of a system 10 according to embodiments of the present invention. As shown, the system 10 includes a retailer controller 100 in communication with customer devices 200, 201 and 202. The retailer controller 100 may comprise one or more computer servers providing, for example, a database server and a World Wide Web server. In one embodiment, the World Wide Web server operates to receive requests for web pages from the customer devices 200, 201 and 202, to create web pages, and to transmit the web pages to the customer devices 200, 201 and 202. In this regard, the retailer controller 100 may determine price adjustments, transmit the price adjustments via the World Wide Web to a customer operating one of the customer devices 200, 201 and 202, and may also extract payment from the customer in accordance with the price adjustments.

Each of the elements of the system 10 may be located in a retail store. For example, the retailer controller 100 may be a computer server located in a control center within the retail store, and the customer devices 200, 201 and 202 may be customer kiosks situated at various locations within the retail store. However, the elements of the system 10 need not be located at a retail store or in a same location. Rather, the system 10 may be used in an online embodiment wherein at least one of the customer devices 200, 201 and 202 is located remotely from the retailer controller 100. It should be noted that the system 10 may simultaneously provide remote and in-store functionality.

Multiple physical devices may be used to perform the functions of the retailer controller 100 according to the present invention, and some or all of these functions may also be performed manually. The retailer controller 100 may be operated by a retailer, by an entity providing customer acquisitions services to retailers, by an entity providing shopping and retail services to customers, by an entity providing online store fronts to retailers or by any other entity to which the present invention may provide benefits. In the following description, actions which may be performed by an entity operating the retailer controller 100, such as reception of payment, will be imputed to the retailer controller 100.

As described above, at least one of the customer devices 200, 201 and 202 may be a dedicated kiosk operated within a retail store to communicate with the retailer controller 100, which may or may not be located in the retail store. One or more of the customer devices 200, 201 and 202 may also comprise a personal computer operated by a customer to access and interact with a website provided by a web server executing within the retailer controller 100. Other types of customer devices 200, 201 and 202 usable in conjunction with the present invention include a personal digital assistant (PDA), an Internet kiosk, a hand-held bar code scanner, a pager, a cellular phone, a pay phone, a video game, an automated teller machine, a slot machine, a watch, a vending machine, an in-car communications system, such as the NAVSTAR system, for providing World Wide Web data or the like, or any other device adapted to communicate with the retailer controller 100 over whatever communication media exist between the device and the controller 100. For example, in a case that the customer device 200 is a PDA, such as a Palm VII™, which communicates with the retailer controller 100 over the World Wide Web, the customer device 200 may execute a web browser application for passing data to the retailer controller 100 and/or requesting data from the retailer controller 100.

In another example, the customer device 200 comprises both a retailer terminal (not shown) located at a retail store and a device such as a PDA used to communicate with the retailer terminal via an infrared or other connection. Such a retailer terminal may be associated with a single product or a group of products. This association allows the retailer controller 100 to identify a product or group of products relating to a received communication by reference to the retailer terminal from which the communication was received.

Figure 1B:
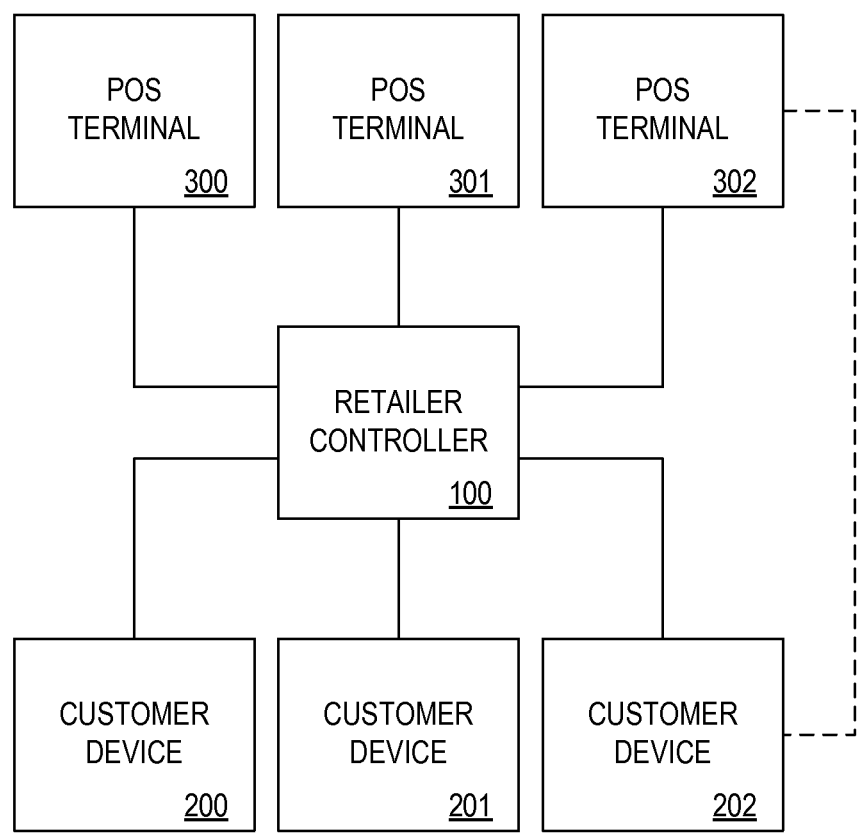
FIG. 1B is a block diagram of a system according to one embodiment of the present invention.

FIG. 1B illustrates a block diagram of a system 20 according to other embodiments of the present invention. The system 20 includes a retailer controller in communication with the customer devices 200, 201 and 202 as described with respect to the system 10. However, the system 20 also includes POS terminals 300, 301 and 302 in communication with the retailer controller 100. The system 20 may be used to embody the invention within a retail store. For example, the retailer controller 100 may be a computer server located in a control center within the retail store, the customer devices 200, 201 and 202 may be customer kiosks situated at various locations within the retail store, and the POS terminals 300, 301 and 302 may be cash registers located at a "checkout" area in the store. Of course, it is not required that any of the elements of the system 20 actually be located in a retail store.

One or more of the POS terminals 300, 301 and 302 may comprise an electronic cash register, computer terminal, or other type of POS terminal. In one embodiment, each of the POS terminals 300, 301 and 302 is located at a single retail store and is used to determine prices for products brought to the terminal and to charge a customer for each of the products. The POS terminals 300, 301 and 302 may also comprise dedicated terminals used solely in conjunction with the retailer controller 100 to determine price adjustments according to the present invention, or credit/debit card authorization terminals provided with software enabling operation in accordance with the present invention. In other embodiments, the retailer controller 100 controls the determination and transmission of price adjustments for several retailers, and each of the POS terminals 300, 301 and 302 is located at a different retail store along with one of the customer devices 200, 201 and 202.

As shown in FIG. 1B, the customer device 202 may communicate directly with the POS terminal 302. Such communication may occur via an infrared or other interface, and may be used to transmit a customer identifier, a payment identifier, a transaction identifier, and/or price adjustment information stored in the customer device 202 to the POS terminal 302.

Although three customer devices are shown in FIG. 1A and FIG. 1B and three POS terminals are also shown in FIG. 1B, any number of customer devices and POS terminals may be in communication with the retailer controller 100 according to either embodiment of the invention. Furthermore, although the communication media between the customer devices 200, 201 and 202, the POS terminals 300, 301 and 302 and the retailer controller 100 are represented by dedicated connections, it should be understood that one or more of the customer devices 200, 201 and 202 and, in the case of the system 20, of the POS terminals 300, 301 and 302, may be connected to a network, such as a Local Area Network (LAN) or a Wide Area Network (WAN), to which is also connected the retailer controller 100. The network may be an Internet Protocol (IP)-based network, such as the World Wide Web, and/or one or more of a satellite-based network, a cellular network, a radio frequency (RF) network, a telephone network, a cable television network, or any other communication system for transferring data between locations.

It should also be understood that the invention may be embodied in hardware configurations other than those shown in FIG. 1A and FIG. 1B. For example, the invention may be embodied entirely in a customer device provided to customers by a retailer upon entry into a retail store. In other embodiments, indications of interest are received and price adjustments are determined by a customer device or a POS terminal, and the POS terminal is used to charge a customer appropriate retail prices and prices based on price adjustments.

Those skilled in the art will understand that devices in communication with each other need not be continually transmitting to each other. On the contrary, such devices need only to transmit to each other as necessary, and may actually refrain from exchanging data most of the time. For example, a device in communication with another device over the World Wide Web may not transmit data to the other for weeks at a time.

Figure 2:
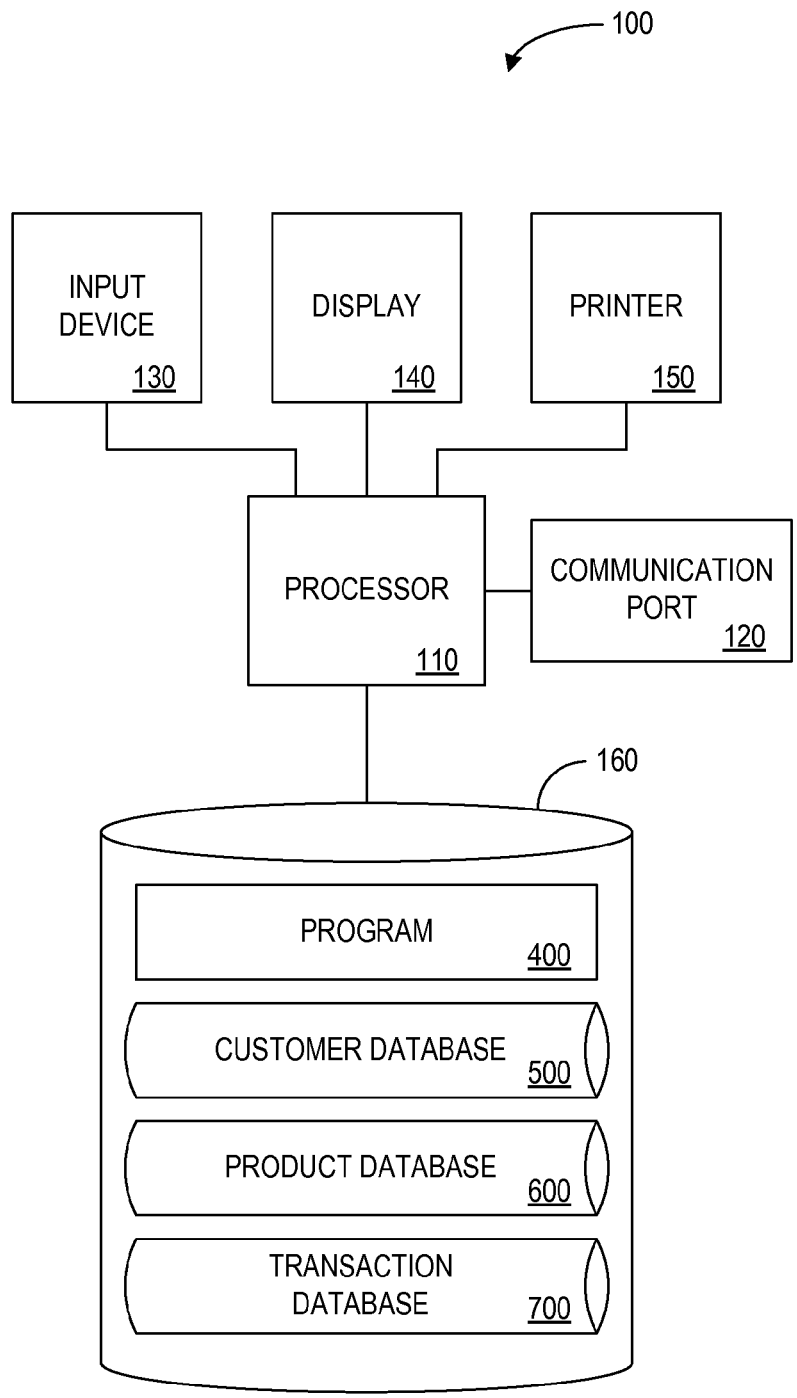
FIG. 2 is a block diagram of a retailer controller according to one embodiment of the present invention.

FIG. 2 illustrates an embodiment of the retailer controller 100. The retailer controller 100 may be implemented using a network server, a dedicated hardware circuit, an appropriately-programmed general purpose computer, or any other electronic, mechanical or electro-mechanical device.

The retailer controller 100 of FIG. 2 comprises a processor 210, such as one or more RISC® processors. The processor 110 is coupled to a communication port 120 through which the retailer controller 100 communicates with other devices. For example, the retailer controller 100 receives an indication of interest in a first product from the customer device 200 and transmits a price adjustment for a second product to the customer device 200 through the communication port 120. As mentioned above, each of the customer devices 100, 101 and 102, as well as the POS terminals 300, 301 and 302, may communicate with the retailer controller 100 over different communication media. Accordingly, the communication port 120 is configured, in one embodiment, to communicate using hardware and software protocols of the different media. In addition, the retailer controller 100 can communicate with locally-attached devices through the communication port 120.

Also connected to the processor 110 are an input device 130, a display 140 and a printer 150. The input device 130 may be any device for inputting data, such as a keyboard, a touch screen, a mouse, a voice input device, an infrared port, or the like. The input device 130 can be used by personnel to enter data used by the retailer controller 100 in accordance with the present invention, and can be used by an employee or a customer to input an indication of interest in a product to the retailer controller 100.

The display 120 is used to output graphics and text and may be a CRT computer monitor, a flat panel display or another type of display device. Graphics, text or other data may also be output by the printer 150 in hardcopy format.

The processor 110 is also in communication with a data storage device 160. The data storage device 160 is generally a data memory and may include any appropriate combination of magnetic, optical and/or semiconductor memory. The data storage device 160 may also include, for example, Random Access Memory (RAM), Read Only Memory (ROM), a compact disc and/or a hard disk. Furthermore, the processor 110 and the storage device 160 may each be, for example: (i) located entirely within a single computer or other computing device; or (ii) connected to each other by remote communication media such as a serial port cable, telephone line or radio frequency transceiver. In one embodiment, the retailer controller 100 comprises one or more computers that are connected to a remote server computer for maintaining databases.

The data storage device 160 stores a program 400 of processor-executable process steps. The program 400 may be stored in a compressed, uncompiled and/or encrypted format. The program 400 can be stored in the storage device 160 during manufacture of the storage device 160, can be downloaded from a compact disc or other computer-readable medium, or can be retrieved from a remote or local source through the communication port 120 in the form of a signal having the program 400 encoded thereon.

The processor 110 executes the process steps of the program 400 and thereby operates in accordance with the present invention, and particularly in accordance with the steps described herein with respect to the retailer controller 100. In one example, the process steps of the program 400 are executed to receive an indication from a customer of interest in a first product, to receive an indication from a customer of interest in a second product, to determine a price adjustment for the second product based on the indication of interest in the first product, and to transmit the price adjustment to the customer.

According to one embodiment of the present invention, the steps of the program 400 are transferred from the data storage device 160 into a main memory, such as a RAM, and executed therefrom by the processor 110. In alternate embodiments, hard-wired circuitry may be used in place of, or in combination with, processor-executable software process steps for implementation of the processes of the present invention. Thus, embodiments of the present invention are not limited to any specific combination of hardware or software.

The data storage device 160 also stores processor-executable process steps for basic operation of the retailer controller 100, such as process steps of an operating system, a Web server, a database management system and "device drivers" for allowing the retailer controller 100 to interface with computer peripheral devices. These latter process steps are known to those skilled in the art, and are therefore not described in detail herein.

The storage device 160 also stores i) a customer database 500, ii) a product database 600, and iii) a transaction database 700. The databases 500 to 700 are described in detail below and portions thereof are depicted in tabular form with sample entries in the accompanying figures. In this regard, and as will be understood by those skilled in the art, the schematic illustrations and accompanying descriptions of the databases presented herein are merely intended to demonstrate operable systems for associating and storing information which may be used in accordance with the present invention. A number of other data structures may be employed besides those suggested by the tables shown. Similarly, the illustrated entries of the databases represent sample information only; those skilled in the art will understand that the number and content of the entries can be different from those illustrated.

Figure 3:
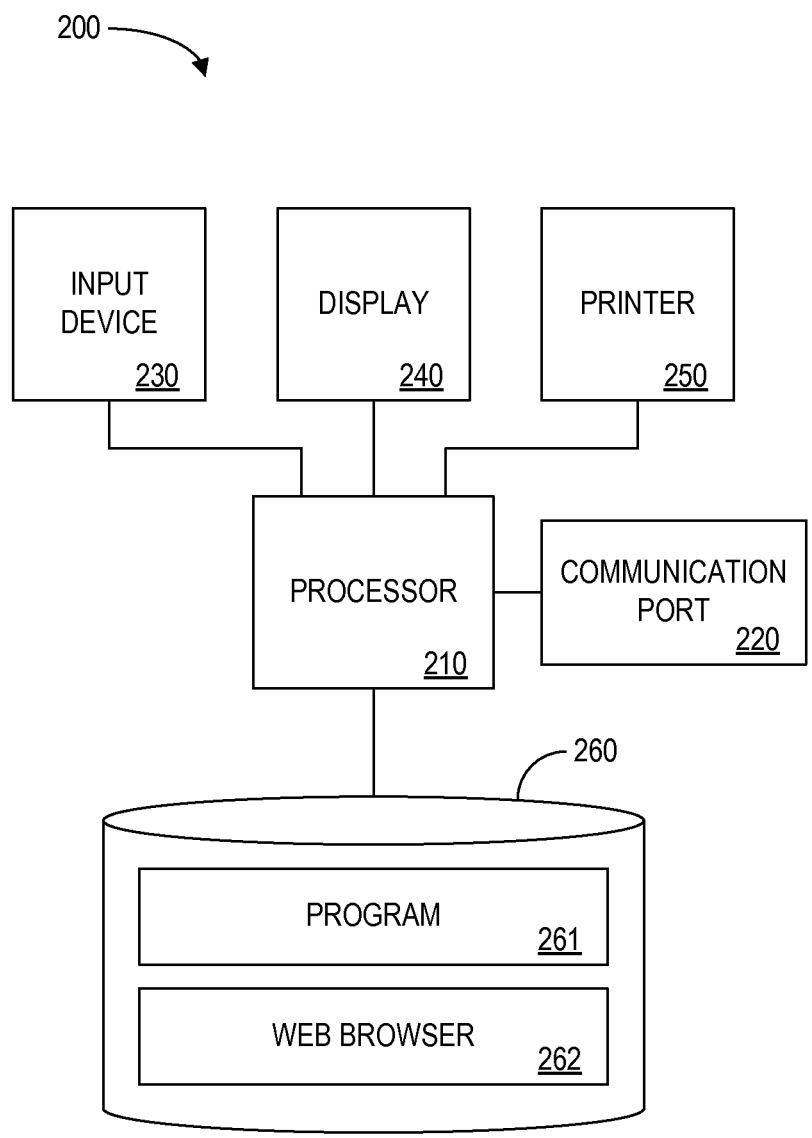
FIG. 3 is a block diagram of a customer device according to one embodiment of the present invention.

FIG. 3 illustrates several elements of the customer device 200. The customer device 200 is used in one embodiment to input data to and to receive data from the retailer controller 100, and to present data to a customer. For example, a customer may use the customer device 200 to indicate an interest in a first product, to indicate an interest in a second product, and to receive a price adjustment for the second product, the price adjustment being determined based on the interest in the first product and being different from another price adjustment for the second product received in a case that no interest in the first product is indicated.

As shown, the customer device 200 includes a processor 210 connected to a communication port 220. The communication port 220 is configured to transmit data to the retailer controller 100 via a network connection, such as the World Wide Web, via an intermediate device, such as the above-described retailer terminal, via dedicated connection, or via another connection, and to receive data from the retailer controller 100. Also connected to the processor 210 are an input device 230 for receiving data and instructions from a customer, a display 240 for displaying data to the customer, and a printer 250 for creating a hardcopy of data, such as of a confirmation of a price adjustment and terms thereof. The input device 230, the display 240 and the printer 250 may comprise any of the input devices, displays, or printers discussed above.

A storage device 260 is also connected to the processor 210, and stores data and processor-executable process steps for the operation of the customer device 200. Specifically, the storage device 260 stores process steps of a program 261 which may be executed to control the customer device 200 to operate as described herein. The process steps of the program 261 may be stored in the storage device 260 during its manufacture, may be downloaded from a compact disc or other computer-readable medium, or may be retrieved from a remote or local source through the communication port 220 embodied in a signal having the process steps encoded thereon.

Also stored in the storage device 260 are processor-executable process steps of a web browser 262 which can be executed by the processor 210 to provide communication between the customer device 200 and a Web server executing within the retailer controller 100 via the World Wide Web. Of course, depending on the communication media disposed between the customer device 200 and the retailer controller 100, other known applications or hardware may be needed for the customer device 200 to communicate with the retailer controller 100. Process steps of an operating system (not shown), such as the Palm® operating system, are also stored in the storage device 260 and executed by the processor 210 to control basic operation of the customer device 200.

In some embodiments, the invention is embodied solely in the customer device 200, which may be given to customers upon entering a retail store. In these embodiments, the program 261 includes process steps executed by the processor 210 to receive an indication from a customer of interest in a first product, to receive an indication of interest in a second product, to determine a price adjustment for the second product based on the indication of interest in the first product, and to transmit the price adjustment to the customer. The program 261 also includes, according to these embodiments, process steps executable to identify a product to be purchased by a customer, to determine whether the product is associated with a price adjustment transmitted to the customer and determined based on an indication of interest from the customer in a first product, and to determine whether the first product is being (or has been) purchased by the customer, and, if it is determined that the first product is being (or has been) purchased by the customer, to charge the customer a price for the product based on the price adjustment. The databases 500 to 700 are also stored in the storage device 260 according to some of these embodiments.

Figure 4:
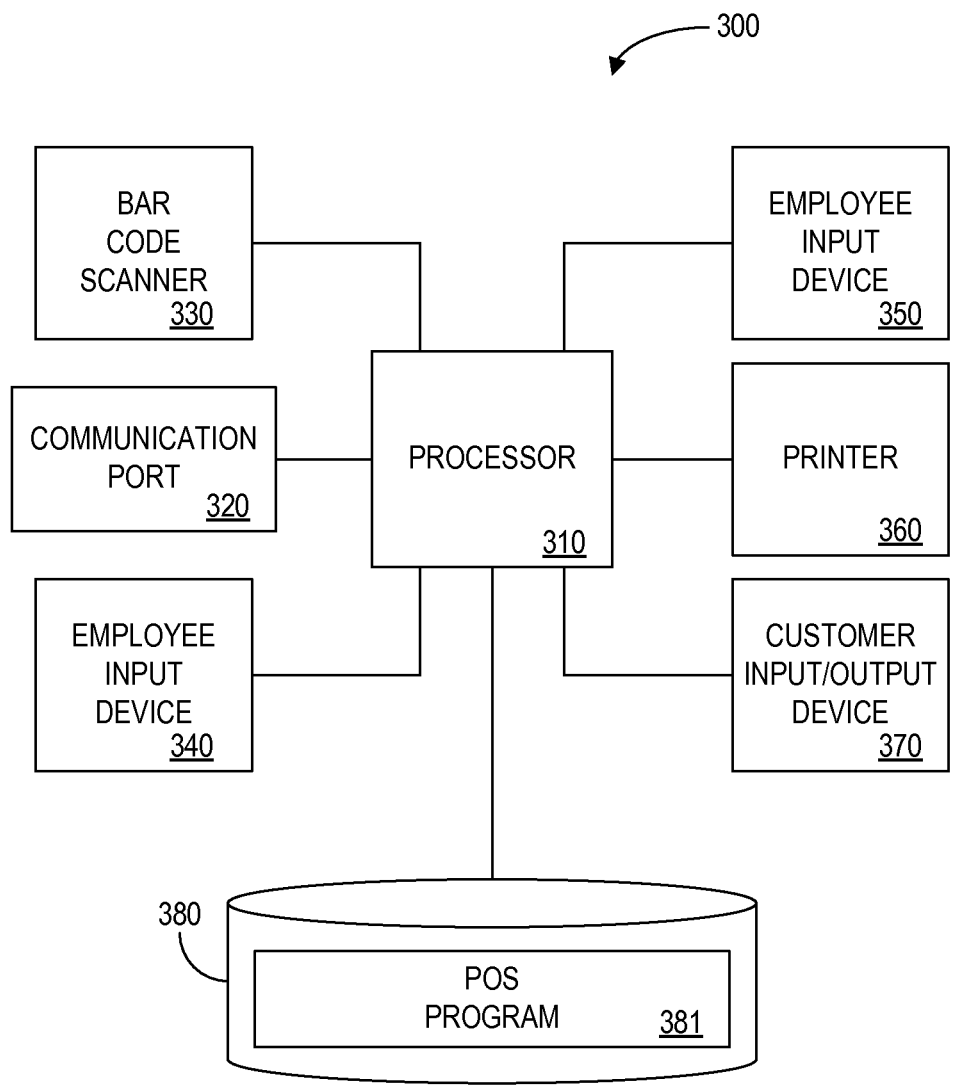
FIG. 4 is a block diagram of a point-of-sale (POS) terminal according to one embodiment of the present invention.

FIG. 4 is a block diagram showing several components of the POS terminal 300 according to one embodiment of the invention. According to one version of this embodiment, the POS terminal 300 receives a customer identifier from a customer who has brought products to the POS terminal 300 for the purpose of purchasing the products. The POS terminal 300 also identifies a product to be purchased by a customer, uses the customer identifier to determine whether the product is associated with a price adjustment transmitted to the customer and determined based on an indication of interest from the customer in a first product, determines whether the first product is being (or has been) purchased by the customer, and charges the customer in accordance with the price adjustment if it is determined that the first product is being (or has been) purchased by the customer. Details and variations of the foregoing process are set forth below.

The POS terminal 300 of FIG. 4 includes a processor 310 for executing processor-executable process steps and a communication port 320 connected thereto for communicating with the retailer controller 100 over a network or a dedicated connection. The communication port 320 may also be used to communicate directly with the customer devices 200, 201 and 202, or with other devices. Of course, in the latter embodiment, the communication port 320 is configured to provide communication interfaces compatible with the customer devices 200, 201 and 202 and the other devices.

Also connected to the processor 310 are a bar code scanner 330 for scanning a product bar code, usually located on product packaging, and for extracting a product identifier, such as a Universal Product Code (UPC), a Store Keeping Unit number, or a product identifier internal to the retailer therefrom. Many types of such scanners are known in the art, including a hand-held scanner and a fixed scanner across which a bar code is swiped.

An employee input device 340 is also connected to the processor 310. The employee input device 340 allows an employee to manually enter a product identifier into the POS terminal 300, and also provides cash register functionality. Accordingly, the employee input device 340 comprises a numeric keypad, function keys for invoking convenient functions, and may be embodied in a keyboard, a voice recognition unit, a touch screen, or other input system.

A display 350 is connected to the processor 310 and is used primarily to display prices to the employee and to the customer. In one embodiment, a price to be charged to the customer is displayed on the display 350 each time a bar code is scanned by the bar code scanner 330. After all desired products have been scanned, the display 350 displays a total price due to the retailer. The display 350 may comprise a CRT display, a flat panel display, an LCD display, an LED display, or the like. A printer 360 is primarily used to print receipts and/or coupons for presentation to a customer, and may comprise a thermal printer, a laser printer, an inkjet printer, or other type of printer.

Also connected to the processor 310 is a customer input/output device 370, which is used by a customer to enter a customer identifier and payment information into the POS terminal 300. For example, the customer input/output device 370 may present a request to the customer to swipe her frequent buyer card or other retailer-affiliated card through a magnetic card reader of the customer input/output device 370. After the customer swipes her card and a customer identifier is read therefrom, the customer input/output device 370 may request the customer to swipe a credit or debit card through the card reader so as to provide an account to which the total price may be charged. Accordingly, the customer input/output device 370 may comprise a credit or debit card authorization terminal.

In other embodiments, the customer input/output device 370 is an interface port through which the customer device 202, such as a PDA, may communicate with the POS terminal 302. As such, the customer identifier and/or the account identifier may be directly transmitted from the customer device 202 to the POS terminal 302. The customer input/output device 370 according to this embodiment may also be used to receive price adjustment information, discussed in detail below, directly from the customer device 202.

A storage device 380 is connected to the processor 310, and stores processor-executable process steps of a POS program 381 which are executed by the processor 310 so as to allow the POS terminal 300 to operate in accordance with the present invention. As described above with respect to the storage device 260 and the storage device 160, the process steps of the POS program 381 may be stored in the storage device 380 during manufacture of the storage device 380, may be downloaded from a compact disc or other computer-readable medium, or can be retrieved from a remote or local source through the communication port 320 in the form of a signal having the process steps encoded thereon.

Figure 5:
FIG. 5 illustrates a tabular representation of a portion of a customer database according to one embodiment of the present invention.

FIG. 5 illustrates a tabular representation of a portion of the customer database 500 according to one embodiment of the present invention. The customer database 500 is used to store general information about a customer which may be used by a system according to the present invention. The information stored in the customer database 500 may be obtained by requiring a customer to submit a written registration form requesting certain customer information or by requiring the customer to complete fields of a registration web page transmitted to a customer device via the World Wide Web. In a case that the information is obtained through a written registration form, the information may be entered into the customer database 500 by an employee operating the input device 130 of the retailer controller 100. The information may also be stored in the storage device 260 of the customer device 200 and transmitted therefrom to the retailer controller 100.

Each record shown in the illustrated portion of the customer database 500 includes several fields, the fields specifying: i) a customer identifier 510 preferably used throughout the databases of the data storage device 160 to associate data with an associated customer; ii) a name 520 of the associated customer; iii) contact information 530 for use in contacting the associated customer; iv) a payment identifier 540 usable to extract payment from the associated customer; and v) a customer rating 550. It should be noted that the invention may be embodied in a system which does not use any of the information illustrated in the customer database of FIG. 5.

The contact information 530, as shown, may include any type of information by which a retailer may contact a customer, such as a postal address, an electronic mail address, a telephone number, a facsimile number or the like. The payment identifier 540 may specify a credit card number, a checking account number, an online bill payment service or other information using which the retailer may extract a payment from a customer.

The customer rating 550, in one embodiment, is based on an associated customer's purchasing history. For example, a customer having purchased items resulting in over $500 profit for a retailer in a past year is assigned a Gold customer rating 550, while a customer having purchased items resulting in less than $50 in profit is assigned a Bronze customer rating 550. A customer may also pay a fee in order to be associated with a particular customer rating. In one embodiment, the customer rating 550 is used to determine a price adjustment to provide to a customer. In this embodiment, after receiving an indication from a customer of interest in a first product, the retailer controller 100 determines a price adjustment for a second product based on the indication and based on a customer rating 550 associated with the customer. For example, the price adjustment reflects a lower sale price if the customer is associated with a Gold customer rating 550 than if the customer is associated with a Bronze customer rating 550. In other embodiments, only customers having a certain rating are eligible to receive price adjustments according to the present invention.

FIG. 6 shows a tabular representation of a portion of the product database 600. The product database contains information relating to products sold by a retailer operating the retailer controller 100. The information may be used to determine a second product for which to provide a price adjustment, and/or to determine a price adjustment for a second product based on an indication of interest in a first product. The fields of the product database 600 specify: i) a product identifier 610 uniquely identifying a product offered for sale by the retailer; ii) a product description 620 describing the product; iii) a retail price 630 of the product; iv) a cost 640 of the product to the retailer; v) an amount in inventory 650; and vi) a minimum sale price 660.

The retail price 630 is, in one embodiment, a price for which an associated product is offered for sale and sold to a customer absent any price adjustment according to the invention. Of course, a retail price 630 may reflect a price discount other than a price adjustment according to the invention. For example, a retail price 630 associated with a product may be decreased by 10% in a case that the retailer wishes to provide at least a 10% discount to any customer purchasing the product.

The cost 640 may include a price for which the retailer purchases the associated product from a manufacturer, a cost for warehousing the product, other inventory costs, and overhead such as rent and utilities attributable or charged to the product. The amount in inventory 650 may be used as an estimate of demand for an associated product. For example, the retailer controller may offer a significant price adjustment for a product associated with a large amount in inventory 650. It should be noted that revenue management information other than a cost 640 and an amount in inventory 650 may be stored in the product database 600 and used to determine a price adjustment for a product. Revenue management information may include information relating to demand, supply, volume, profit margins, forecasted inventory, or other variables such as those specified in the book, "Revenue Management—Hardcore Tactics for Market Domination", by Robert G. Gross.

The minimum sale price 660 may be a price set by a product manufacturer in order to control price dilution. In this regard, product manufacturers often expend great effort in developing a pricing structure intended to maximize sales of each product in a product line. Reducing a retail price of such a product may compromise the integrity of the pricing structure. Accordingly, these manufacturers may set a minimum sale price 660 to preserve the integrity of the pricing structure. In one embodiment, the minimum sale price 660 is compared to a price adjustment determined for a product to ensure that the price adjustment does not reflect a sale price of less than the minimum sale price 660.

Figure 7:
FIG. 7 illustrates a tabular representation of a portion of a transaction database according to one embodiment of the present invention.

A tabular representation of a portion of the transaction database 700 is shown in FIG. 7. Generally, the transaction database 700 may be used by the retailer controller 100, the customer device 200, and/or the POS terminal 300 to determine appropriate sale prices to charge a customer for products represented therein. In one embodiment, the transaction database is used to identify a product to be purchased by a customer, to determine whether the product is associated with a price adjustment transmitted to the customer and determined based on an indication of interest from the customer in a first product, to determine whether the first product is being (or has been) purchased by the customer, and to charge the customer according to the price adjustment if it is determined that the first product is being (or has been) purchased by the customer.

The fields of the transaction database 700 include: i) a transaction identifier 710 identifying a single sales transaction involving one or more products; ii) a customer identifier 720 uniquely identifying a customer participating in the sales transaction; iii) a product identifier 730 identifying a product involved in the sales transaction; iv) a retail price 740 of the product; v) a price adjustment 750 for the product; and vi) required product(s) 760 in which an interest must be shown, in one embodiment, or which must be purchased, according to another embodiment, in order for a customer to receive the associated price adjustment 750.

As shown in FIG. 7, a single product identifier 730 may be associated with several price adjustments 750, with each of the several price adjustments associated with respective required product(s) 760. As also shown in FIG. 7, more than one required product(s) 760 may be associated with a price adjustment 750 and a product identifier 730. In the latter case, and depending upon the particular embodiment, a customer must indicate an interest in, indicate an intent to purchase, or actually purchase each of the more than one required product(s) 760 in order to receive the associated price adjustment 750.

In one example illustrated in FIG. 7, a customer identified by the customer identifier 720 C-2532 is required to purchase the required product 760 P-10596 in order to receive a price adjustment 750 associated with the product identifier 730 P-96832, and is further required to purchase the required product 760 P-96832 in order to receive the price adjustment 750 associated with the product identifier 730 P-12457. It should be understood that any number of products may be similarly interrelated.

In one embodiment, the transaction database 700 is stored in the storage device 260 of the customer device 200. According to this embodiment, the transaction database 700 may be populated by the retailer controller 100 while a customer shops for products in a retail store and transmitted to the customer device 200 prior to checkout, or may be created and populated by the customer device 200 entirely. In either case, the transaction database 700 may be transmitted from the customer device 202 to the POS terminal 302 via the customer input/output device 370 prior to checkout. Population and usage of the transaction database 700 will be described in detail below.

Figure 8:
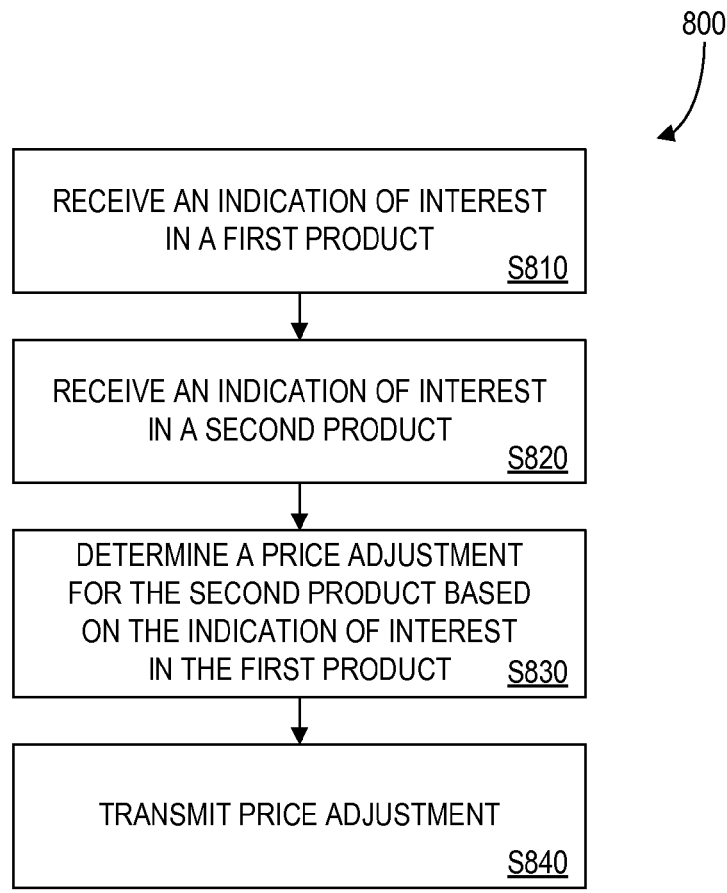
FIG. 8 is a flow chart of process steps to transmit a price adjustment according to one embodiment of the present invention.

FIG. 8 is a flow chart of process steps 800 according to one embodiment of the present invention. In a case that the retailer controller 100 performs the process steps 800, the process steps 800 may be embodied in hardware within the retailer controller 100, in processor-executable process steps stored on a computer-readable medium such as the data storage device 160 and executed by the processor 110, in processor-executable process steps encoded in electronic signal received by the retailer controller 100 and executed by the processor 110, or in any combination thereof. It should be noted that the process steps 800 may be, wholly or in part, stored in and/or executed by the processor 210 of the customer device 200 or the processor 310 of the POS terminal 300.

Briefly, the FIG. 8 process steps include reception of an indication from the customer of an interest in a first product, reception of an indication from the customer of an interest in a second product, determination of a price adjustment for the second product based on the indication of interest in the first product, and transmission of the price adjustment to the customer.

Initially, in step S810, an indication of interest in a first product is received from a customer. It should be noted that also received in step S810 may be an indication of interest in one or more other products, in which case the process steps 800 may be affected as noted below.

An indication of interest in a product may be received in many ways in accordance with the present invention. For example, in an embodiment in which the customer is physically present in a retail store, the indication of interest is received when a customer uses a customer device, such as an in-store kiosk, a PDA or other handheld device in communication with the retailer controller 100 via the World Wide Web or another type of network, to locate and request information regarding a first product. An indication of interest may also be received once the customer uses a customer device to indicate an intent to purchase the first product by adding the first product to a real or virtual "shopping cart". An indication of interest may be received in step S810 as a result of the customer simply entering the retail store, approaching a customer service counter, registering to receive price adjustments, or accepting a handheld device offered by the retail store. The customer may use such a handheld device to scan a product bar code on a first product, in which case a UPC extracted from the bar code and transmitted to the retail controller 100 is received in step S810 as an indication of interest in the first product. The retail store may track a customer's location within the store and receive an indication of interest in a first product if the customer approaches the first product or it is determined that the customer is located near to the first product for a specified amount of time, thereby suggesting that the customer is evaluating the first product. Additionally, the indication of interest received in step S810 may include a commitment by the customer to purchase the first product.

In an online embodiment of step S810, a customer's initial request to access a home page of a website operated by a retailer or an indication that a web page including a representation of the product has been viewed for a particular period of time may each be considered an indication of interest in a first product. Also, selection of a picture or a description of a product displayed on a web page of the website, addition of the product into a virtual shopping cart, or an indication of a desire to purchase the first product may each be considered received indications of interest in the first product in step S810. Further details of one online embodiment are described below with respect to FIG. 10 through FIG. 13.

An indication of customer interest may be received from a party other than a customer. For example, an online ad-tracking service such as Doubleclick™, friends of the customer, or an entity storing information regarding the customer's tastes, needs or desires may provide a retailer with an indication of customer interest received in step S810. In addition, information relating to a previous purchase of a product by the customer or by the customer's friends may be received in step S810 as an indication of an interest in the same or a different product.

In a case that the first product is an initial product in which an indication of interest is received, the retailer controller 100 or the customer device 200 may create a record of the transaction database 700 in step S810 which corresponds to a new transaction. Accordingly, a transaction identifier 710 identifying the new transaction is assigned to the record, as is a customer identifier 720 identifying the customer. Of course, a record of the transaction database 700 corresponding to a new transaction may be created when a customer enters a retail store, receives a customer device 200 from a retailer, accesses a retailer website, registers at a kiosk in a retail store, or at other appropriate times. Included in the record may be a product identifier 730 corresponding to the first product, as shown with respect to the product identifier 730 P-55667 in FIG. 7.

Following step S810, an indication of an interest in a second product is received from the customer in step S820. In one embodiment, a message is transmitted to the customer such as "Keep shopping for more discounts!" after step S810 in order to encourage the customer to indicate an interest in a second product. Such an indication may consist of any of the activities described above with respect to step S810. Moreover, the indication may be received based on a determination of an association between the first product and a second product or based on a pre-stored association between the first product and the second product.

Several methods for determining a second product based on an indication of interest in a first product are described in U.S. patent application Ser. Nos. 09/085,424 and 09/360,422. In one method described in Ser. No. 09/085,424, a second product is determined based on a first product and on revenue management-related data, such as relative profit margins, inventory, demand and whether or not the products are complementary in nature. An indication may also be received in step S820 based on stored information indicating that the customer previously indicated an interest in the second product, or based on a customer profile indicating the customer's likes, dislikes, hobbies, occupation, gender, income range or other information.

Next, in step S830, a price adjustment for the second product is determined based on the indication of interest in the first product. A specific embodiment for determining a price adjustment according to step S830 is described below with respect to FIG. 9. Generally, the price adjustment may be determined in step S830 based on the retail price of the second product, a retail profit margin of the first product, a retail profit margin of the second product, revenue management information as described above, a likelihood that the customer will actually purchase the first product, and/or a customer rating 550. The price adjustment may also be determined based on a price sensitivity of the customer, which may be determined based on whether the first product is a "high-end" or a "low-end" product. In one embodiment, the price adjustment is determined based on an indication of interest in one or more additional products which may be stored in the customer database 500.

In another embodiment, a price adjustment is determined in step S830 based on respective retail prices of several products selected by a customer for purchase, and based on any price adjustments already determined for the several products. In this regard, an already-determined price adjustment may be considered in the step S830 determination only if included among the several products are other products which a customer is required to purchase in order to receive the already-determined price adjustment.

In one embodiment of step S830, a determined price adjustment associated with a given product is compared with a minimum sale price 660 also associated with the given product to ensure that a sale price according to the price adjustment is not less than the minimum sale price 660. If so, the price adjustment is redetermined. It should be noted that price adjustments according to the invention may include other constraints, such as non-transferability, expiration dates/times, and required future commitments (e.g. subscriptions or other purchases).

According to certain embodiments, the transaction database 700 is populated with transaction information in step S830. Specifically, associated in the transaction database 700 are a product identifier 730 identifying the second product, a retail price 740 of the second product which may be determined from the product database 600, the determined price adjustment 750 for the second product, and, as required product(s) 760, a product identifier of the first product. If the determination of the price adjustment 750 was based on more than one product, more than one required product(s) 760 may be associated with the price adjustment 750.

After the price adjustment is determined in step S830, flow proceeds to step S840. In step S840, the price adjustment is transmitted to the customer. As mentioned above, in one embodiment, also transmitted to the customer in step S840 is an indication that the second product will be sold in accordance with the price adjustment only if the first product is purchased. Although in some embodiments the price adjustment is transmitted to the customer in step S840 using a same communication method as used to receive the indications of step S810 and step S820, the price adjustment may be transmitted in step S840 using other systems. In one example, an indication of interest in a second product is received by customer selection of a hyperlink displayed by a web browser and describing the second product. In response, a web page is created to include the price adjustment and the created web page is sent to the web browser. In another embodiment, the price adjustment is transmitted to the customer after the customer has indicated a desire to purchase the second product, thereby providing a pleasant surprise to the customer.

Also transmitted in one embodiment of step S840 is a retail price of the second product, which may be determined by reference to the product database 600. Transmission of the retail price along with the price adjustment may provide additional enticement to the customer to purchase the second product because the transmission may assist the customer in appreciating a discount reflected in the price adjustment.

In some embodiments, flow returns from step S840 to step S820 to receive an indication of interest in another product. Accordingly, a subsequent determination of a price adjustment in step S830 may be based on the indication of interest in the another product, on the indication of interest in the first product, on the indication of interest in the second product, or on any combination thereof.

By virtue of the process steps 800, a customer is presented with an opportunity to receive a price adjustment for a product in which he is interested. Therefore, the customer may be incented to purchase the product in a case where he would not otherwise purchase the product. Moreover, the retailer is willing to provide a price adjustment for the product which would otherwise not be provided because of the indicated interest in another product, which suggests that the retailer may receive a profit from a sale of the another product.

Figure 9:
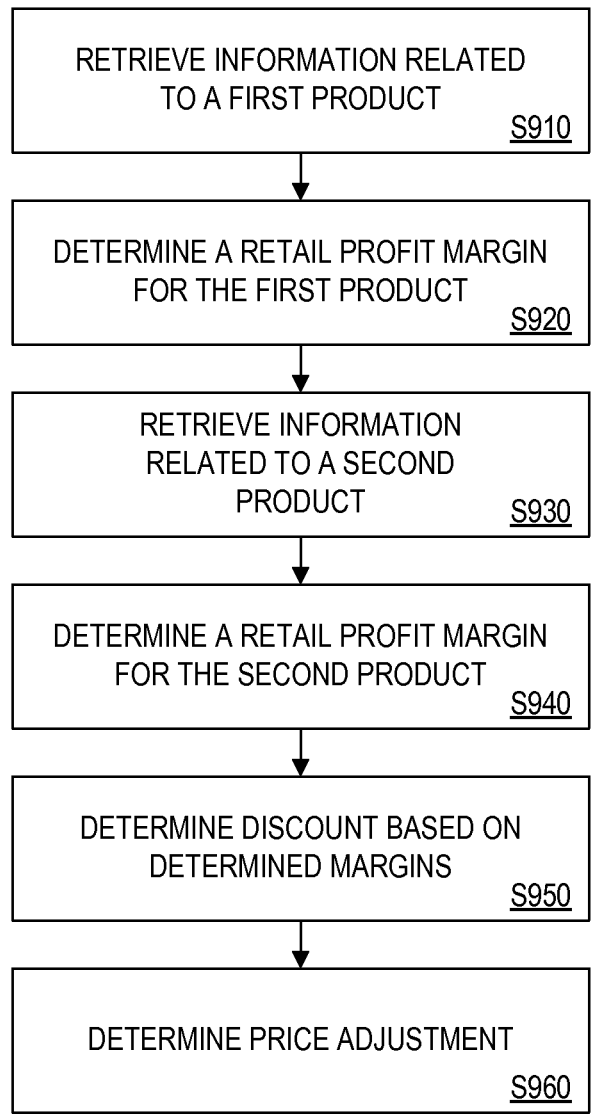
FIG. 9 is a flow chart of process steps to determine a price adjustment according to one embodiment of the present invention.

FIG. 9 is a flow chart of process steps 900 according to one embodiment of step S830 of the process steps 800. Accordingly, the process steps 900 are used in one embodiment to determine a price adjustment for a second product based on an indication of interest in a first product.

Flow begins at step S910, in which information is retrieved relating to the first product in which an indication of interest was received in step S810. Such information may be retrieved in step S910 by using a product identifier corresponding to the first product to locate a corresponding record in the product database 600. According to the example described by the process steps 900, the information retrieved in step S910 includes a retail price 630 and an associated cost 640. Of course, other information relating to the first product may be retrieved in step S910.

Next, in step S920, a retail profit margin of the first product is determined. In one embodiment, the retail profit margin is determined by subtracting the retrieved cost 640 from the associated retail price 630. Information is then retrieved in step S930 related to the second product in which interest was indicated in step S820. The information retrieved in step S930 may be the same information retrieved in step S910, albeit with respect to the second product, or may be different information. In the present example, the information is retrieved in step S930 by locating a record in the product database 600 including a product identifier 610 identical to the product identifier of the second product and by retrieving a retail price 630 and a cost 640 associated with the record. Accordingly, in step S940, a retail profit margin of the second product is determined by subtracting the cost 640 retrieved in step S930 from the retail price 630 retrieved in step S930.

A discount is determined in step S950 based on the margins determined in step S920 and step S940. In one embodiment, the discount is determined in step S950 by adding the two determined margins to determine a total retail profit margin of the first product and the second product. The total is multiplied by a discount factor, such as 10%, to determine the discount. The discount factor may vary depending upon the identities of the first product and the second product. For example, a smaller discount amount may be used if the first product and the second product are popular products than if the products are relatively unpopular.

For the sake of clarity, the following is a description of the foregoing example of step S950 using data illustrated in the above-described databases. Assuming that the first product is identified by the product identifier 610 P-10596 and the second product is identified by the product identifier 610 P-96832, the retail profit margins determined in step S920 and step S940 are $300 and $120, respectively. Adding these two margins results in a total retail profit margin of $420, and multiplying this total retail profit margin by a 10% discount factor results in a discount of $42.

A price adjustment is determined in step S960. In one embodiment, the price adjustment is equal to the discount determined in step S950. That is, according to the foregoing example, the price adjustment for the second product would be equal to "$42 off". Of course, the price adjustment may be determined as a percentage discount value or a sale price based on the determined discount. Referring again to the previous example, thusly-determined price adjustments would be ($42/$200)="21% off" and $158, respectively.

A price adjustment for a second product may be determined based solely on the retail profit margin of the second product. In such an embodiment, the retail profit margin is determined and a discount is determined by multiplying the determined margin by a percentage discount. Again, the price adjustment may be equal to the discount, a percentage discount value or a sale price as described above.

Figure 10:
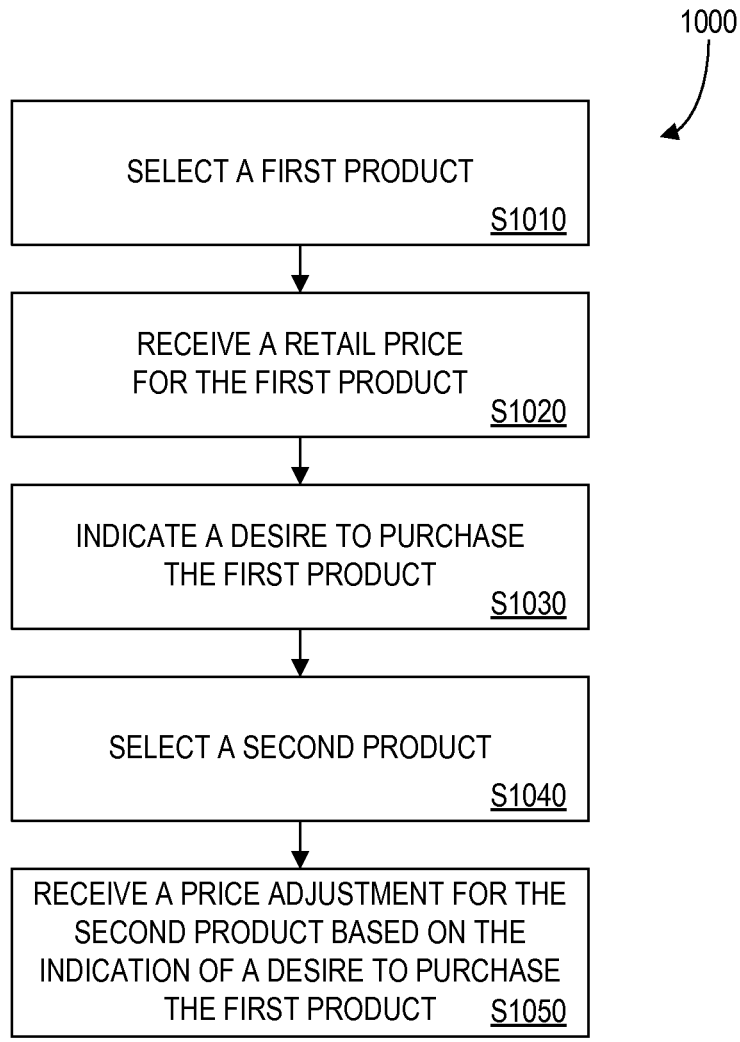
FIG. 10 is a flow chart of process steps to receive a price adjustment according to one embodiment of the present invention.

FIG. 10 is a flow chart illustrating process steps 1000 performed by a customer device 200 according to one embodiment of the present invention. The process steps 1000 may be embodied in processor-executable form and executed by the processor 210 of the customer device 200 solely or in combination with other devices.

Figure 11:
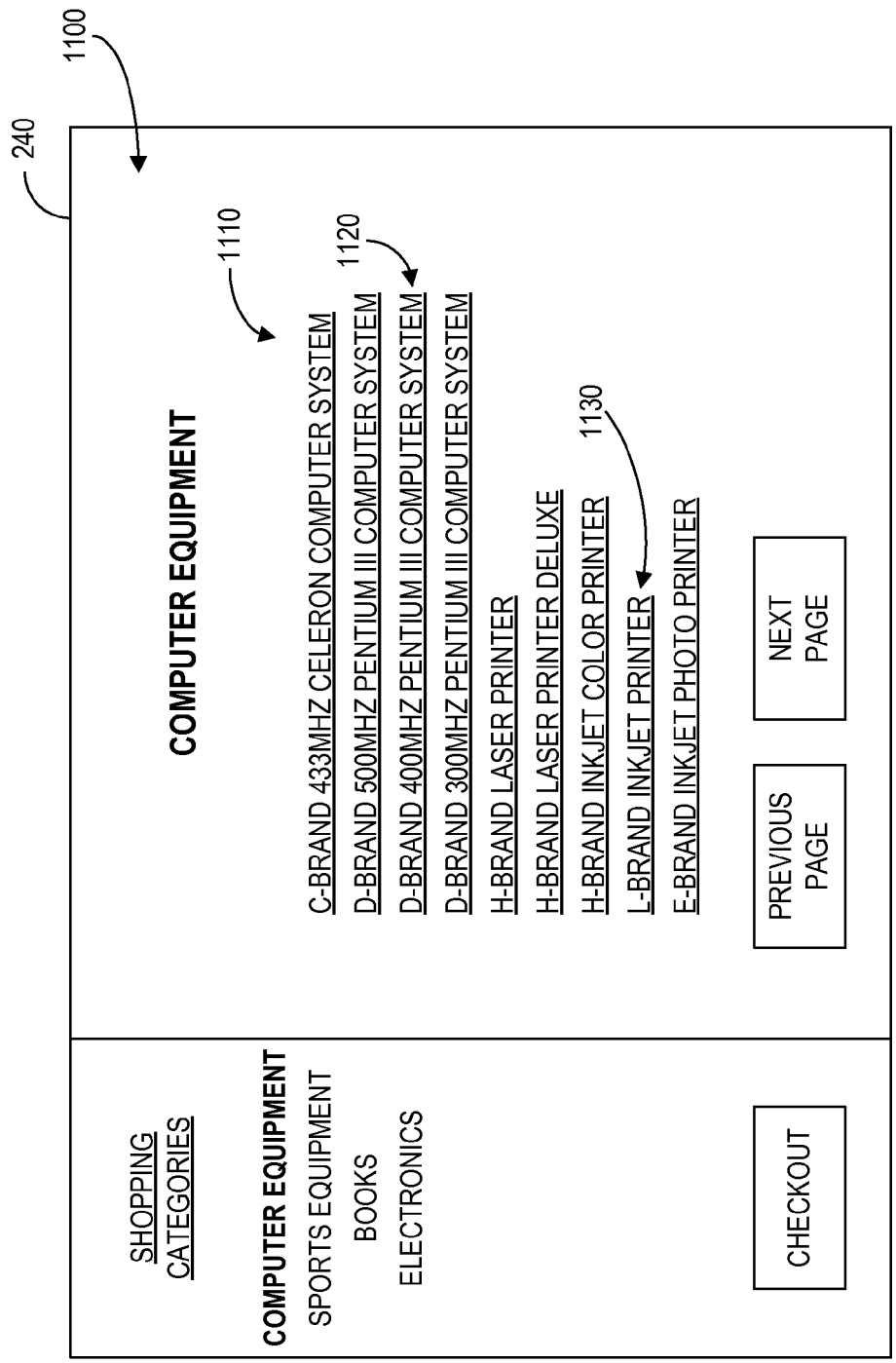
FIG. 11 is a view for illustrating an indication of interest in a product according to one embodiment of the present invention.

The process steps 1000 begin at step S1010, in which a first product is selected. Selection of a first product in step S1010 may proceed using any of the scenarios described above with respect to reception of an indication of interest in a first product in step S810 of the process steps 800. FIG. 11 is a view of the display 240 of the customer device 200 for use in describing one embodiment of step S1010. Shown in FIG. 11 is a web page 1100 transmitted from the retailer controller 100 to the customer device 200 and displayed on the display 240 of the customer device 200 in accordance with one embodiment of the present invention. The web page 1100 was transmitted to the customer device 200 in response to operation of the web browser 262 to access a website maintained by a web server of the retailer controller 100 and to request the web page 1100 therefrom.

Web page 1100 includes a list of hyperlinks 1110 corresponding to various products. In particular, the hyperlink 1120 corresponds to a product described as "D-Brand 400 MHz Pentium III computer system". According to the present example, a customer operates the customer device 200 so as to select the hyperlink 1120 in step S1010.

Figure 12:
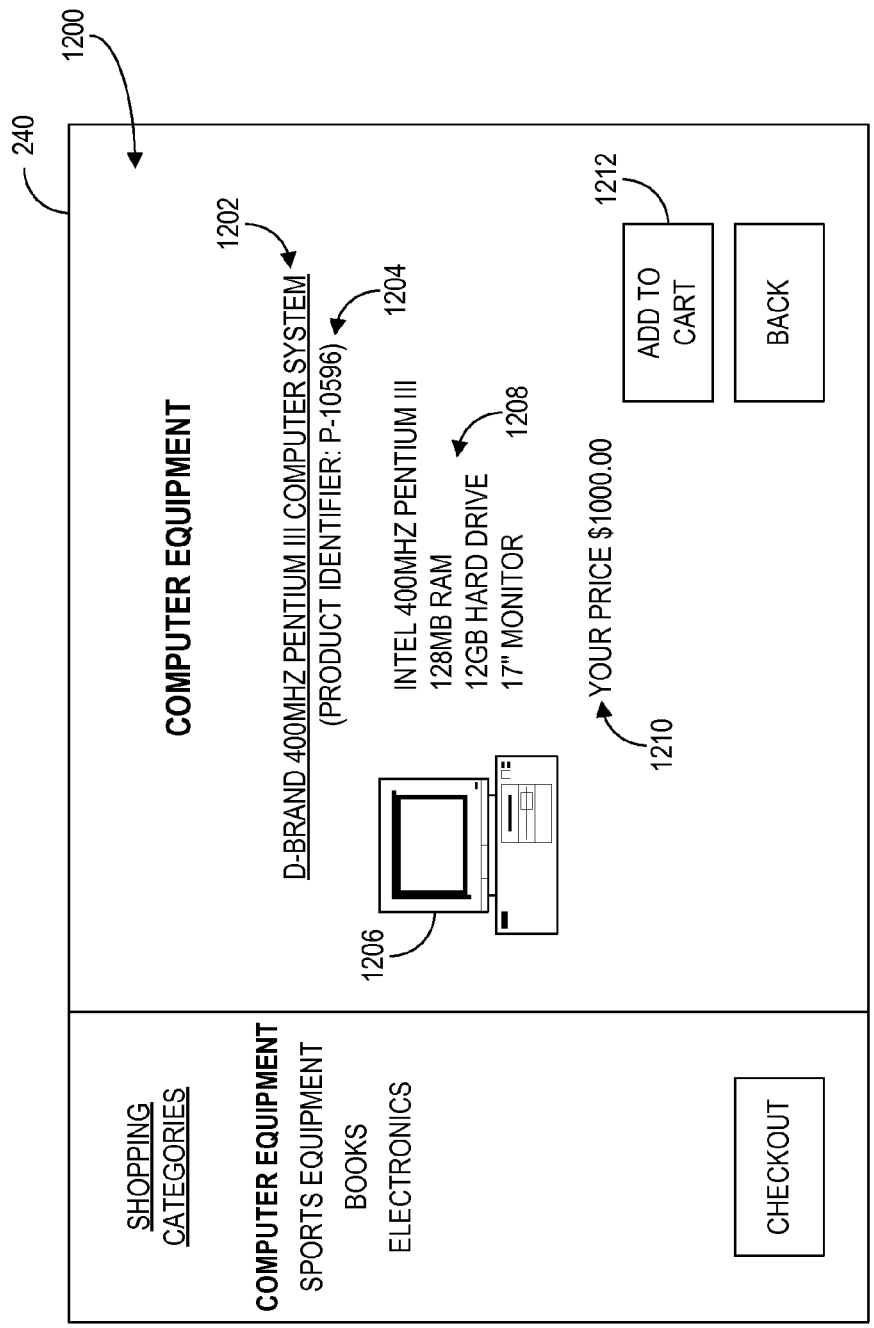
FIG. 12 is a view for illustrating an indication of interest in a product according to one embodiment of the present invention.

In step S1020, a retail price of the first product selected in step S1010 is received. FIG. 12 illustrates one embodiment of step S1020. Shown in FIG. 12 is a web page 1200 transmitted to the customer device 200 in response to selection of the hyperlink 1120. The web page 1200 includes a product description 1202 and a product identifier 1204, each of which may be retrieved from a corresponding record in the product database 600, as well a product view 1206 and a detailed product description 1208. As described with respect to step S1020, the web page 1200 also includes a retail price 1210 of the selected product. Again, the retail price 1210 may be retrieved from the retail price field 630 of the product database 600.

In step S1030, a desire to purchase the first product is indicated. One method for indicating such a desire in S1030 includes selection of the "add to cart" icon 1212 of the web page 1200. As described above, selection of the first product may be considered in some embodiments as an indication of a desire to purchase the first product.

Figure 13:
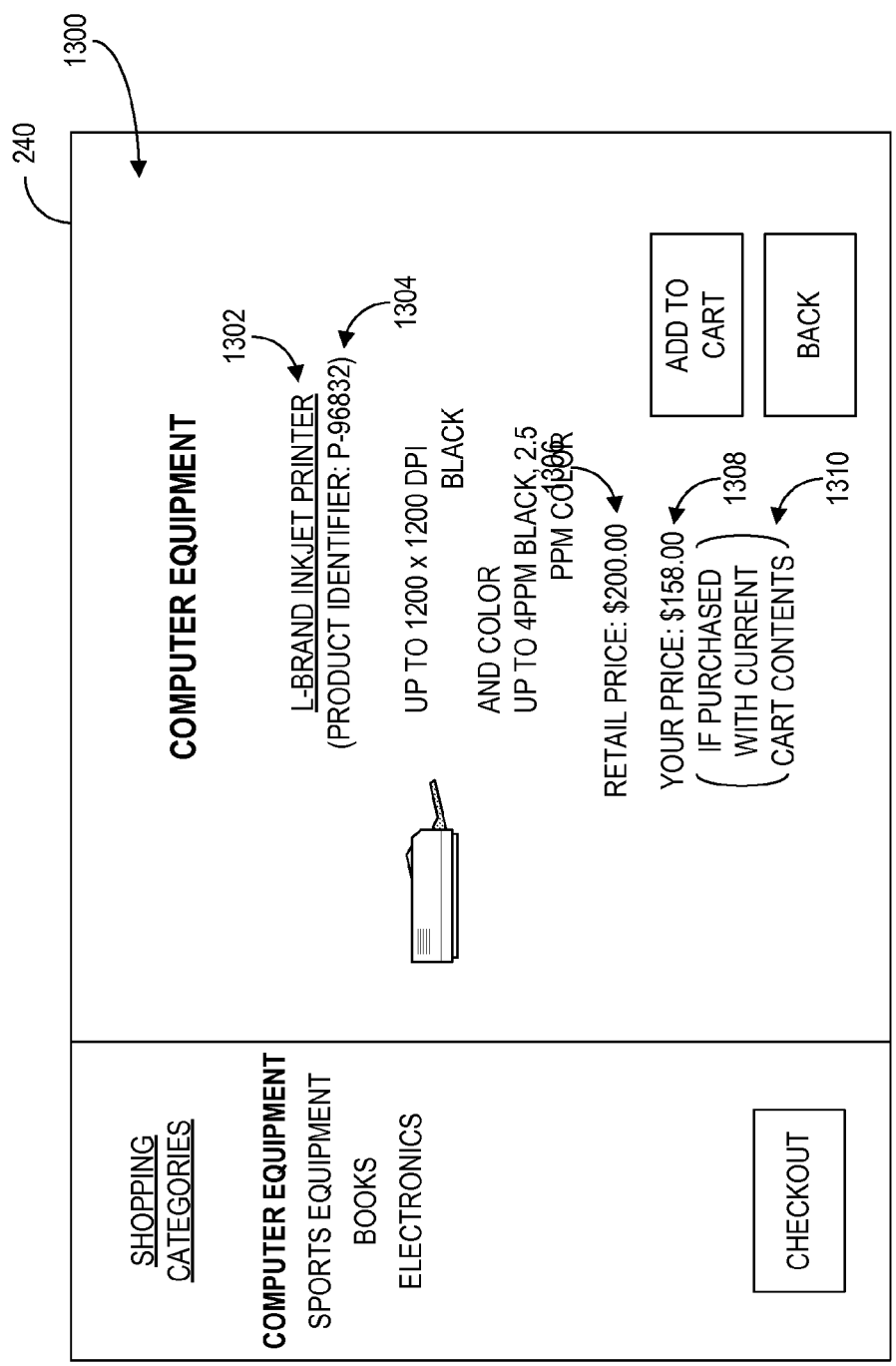
FIG. 13 is a view for illustrating reception of a price adjustment according to one embodiment of the present invention.

A second product is selected in step S1040. For example, returning to FIG. 11, the hyperlink 1130 corresponding to a product described as "L-Brand inkjet printer" may be selected as a second product in step S1040. Next, in step S1050, a price adjustment for the second product is received based on the indication of the desire to purchase the first product. A web page 1300 is shown in FIG. 13 for illustrating step S1050. As shown therein, the web page 1300 as displayed on the display 240 includes a product description 1302, a product identifier 1304 and a retail price 1306 identical to, respectively, a product description 620, a product identifier 610 and a retail price 630, respectively, associated with the selected product. Also received with the web page 1300 is a price adjustment 1308. In the illustrated embodiment, the received price adjustment 1308 is a sale price.

Also shown in FIG. 13 is an indication 1310 that the second product will be sold for a price in accordance with the price adjustment 1308 if the first product is purchased. As described above, such a feature assures a retailer that the sale price of the second product will not be affected by the price adjustment unless the first product is purchased (and the retail profit margin of the first product is received). As a result, the retailer may be more willing to offer a significant price adjustment for the second product. In other embodiments, a second product is sold according to a price adjustment simply by virtue of receipt by the retailer controller 100 of an indication from a customer of interest in the first product, or simply by virtue of receipt from a customer of an indication of an intent to purchase the first product. As described above, these various embodiments provide different amounts of incentive for a retailer to offer a price adjustment and to determine the extent of an offered price adjustment.

Figure 14:
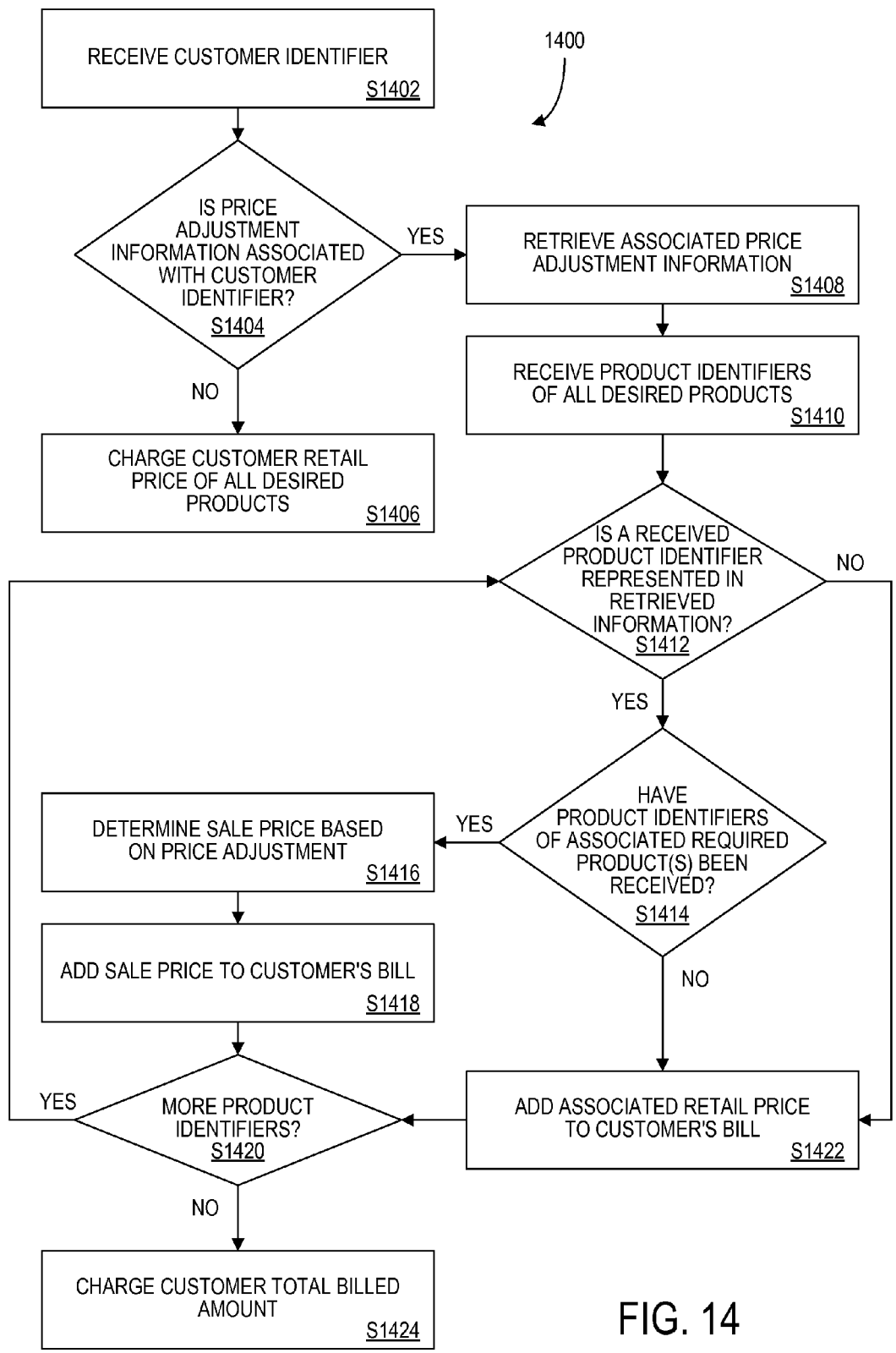
FIG. 14 is a flow chart of process steps to sell products in accordance with price adjustments according to one embodiment of the present invention.

FIG. 14 shows a flow chart of process steps 1400 to sell products in accordance with price adjustments according to one embodiment of the present invention. The process steps 1400 may be embodied in processor-executable process steps of the POS program 381 and executed by the processor 310 of the POS terminal 300. The process steps 1400 may also be embodied in the program 400 stored in the retailer controller 100 or in the program 261 of the customer device 200.

Flow begins at step S1402, in which a customer identifier is received. In one embodiment of step S1402, a customer arrives at a POS terminal 300 of a retail store with several desired products, intending to pay for the products and thereafter to leave the retail store with the products. At the POS terminal 300, the customer input/output device 370 displays a message to the customer instructing the customer to swipe her preferred customer card through a magnetic card reader provided with the device 370. The card reader reads a magnetic strip located on the card in order to receive the customer identifier in step S1402. Alternatively, the customer may swipe a credit or debit card through the magnetic card reader, which retrieves account information from the card and uses the account information in conjunction with the customer database 500 to locate an associated customer identifier 510. The latter arrangement allows the customer to complete a purchase using only one card.

In another embodiment of step S1402, the customer device 202 transmits price adjustment information such as that shown in FIG. 7 to the POS terminal 302 through the customer input/output device 370. The customer identifier 720 is then retrieved therefrom.

Next, in step S1404, it is determined whether price adjustment information is associated with the received customer identifier. In one embodiment, the transaction database 700 is examined to determine whether it includes price adjustment information associated with a customer identifier 720 identical to the received customer identifier. In this regard, a transaction identifier may be received in step S1402 and the transaction database may be examined in step S1404 to determine whether it includes price adjustment information associated with a transaction identifier 710 identical to the received transaction identifier.

If no associated price adjustment information is located, flow continues to step S1406, wherein a product identifier of each desired product is determined using the bar code scanner 330, a retail price of each product is determined by locating a retail price 630 associated with the product identifier, the customer is charged for the associated retail prices, a receipt is printed using the printer 360, and the customer departs the retail store with the desired products.

If it is determined in step S1404 that price adjustment information is associated with the received customer identifier, the price adjustment information is retrieved in step S1408. Specifically, records having an associated customer identifier 720 identical to the customer identifier received in step S1402 are copied from the transaction database 700 to the storage device 380 for fast access to the data therein. Step S1404 and step S1408 may be skipped over in a case that the price adjustment information shown in FIG. 7 is transmitted directly from the customer device 200 to the POS terminal 300.

Next, in step S1410, product identifiers of all desired products are received. In one embodiment, the product identifiers are received by scanning a product bar code corresponding to each product, which is located either on the product or on the product's packaging. Once the product identifiers are received, it is determined in step S1412 whether one of the received product identifiers is represented in the retrieved price adjustment information. More particularly, it is determined whether a first one of the received product identifiers is a product identifier 730 listed in one of the records retrieved in step S1408. If so, it is determined in step S1414 whether product identifiers listed in the retrieved price adjustment information as required product(s) 760 were received in step S1410. Step S1414 therefore is intended to confirm that the customer is purchasing those products that are required in order for the customer to obtain a sale price in accordance with a price adjustment. In this regard, in a case that a product identifier 730 is associated with more than one price adjustment 750 and/or sets of required product(s) 760, either of the sets of required product(s) 760 may be received in step S1410 to result in a positive determination in step S1414.

A sale price corresponding to the received product identifier is determined in step S1416. For example, a price adjustment 750 is identified which is associated with the required product(s) 760 deemed to have been received in step S1414. If the price adjustment 750 is itself a sale price, the sale price determined in step S1416 is equal to the price adjustment 750. If, on the other hand, the price adjustment 750 is a percentage discount value or a price discount value, the sale price is determined in step S1416 by applying the discount value to the associated retail price 740.

In a case that a product identifier 730 is associated with more than one price adjustment 750 and/or sets of required product(s) 760, step S1416 presents several options. For example, the product identifier 730 P-55667 of the transaction database 700 is associated with two price adjustments 750, each of which is associated with a different required product 760. If each required product 760 is being purchased, the sale price determined in step S1416 may be based on both associated price adjustments 750 ($4.50 off a retail price), on a greater of the two price adjustments 750 ($4.00 off a retail price), on a lesser of the two price adjustments 750 ($0.50 off a retail price), or based on which of the two required products 760 were scanned first in step S1410.

The determined sale price is added to the customer's bill in step S1418. It is then determined in step S1420 if any product identifiers received in step S1410 have not been analyzed. If so, flow returns to step S1412 to determine if a next one of the received product identifiers is represented in the retrieved price adjustment information.

Returning to step S1412, if it is determined that the product identifier is not represented in the received information, the retail price 740 associated with the product identifier in the transaction database 700 is determined and the retail price is added to the customer's bill in step S1422. Flow continues from step S1422 to step S1420 and proceeds as previously described.

If it is determined in step S1420 that no received product identifiers remain to be analyzed, flow continues to step S1424 wherein the customer is charged the total billed amount. The amount may be charged to the customer using the payment identifier 540 associated with the customer identifier received in step S1402, or using other known means.

Although the process steps 1400 are described above with respect to a traditional checkout process within a retail store, it should be understood that the process steps 1400 are also applicable to the sale of products in an online environment, with or without variation.

The following are several examples of additional embodiments of the present invention. These examples do not constitute a definition of all possible embodiments, and those skilled in the art will understand that the present invention is amenable to many other embodiments. Those skilled in the art will understand how to make any changes, if necessary, to the above-described system to accommodate these and other embodiments and applications.

In one embodiment, a customer is presented with several price adjustments for a first product, each of the price adjustments associated with a respective different product. According to such an embodiment, the customer may purchase the first product for a sale price in accordance with a price adjustment if the customer also purchases a different product associated with the particular price adjustment. For example, transmitted to a customer may be a price adjustment of $200 for a stereo system and a price adjustment of $175 for the same stereo system. The $200 price adjustment may be associated with a cordless phone and the $175 price adjustment may be associated with a 25 inch color television. This information may be transmitted to the customer in response to an indication from the customer of an interest in the first product or without any customer input. Moreover, different associated products and price adjustments may be determined using any of the methods described above.

In another embodiment, a customer may purchase a second product for a sale price according to a price adjustment if the customer or any other customer associated with the customer in a buying group (same household, company, club, etc.) purchases a first product required for the price adjustment.

The customer may not be required to purchase all required product(s) 760 at a same time in order to receive an associated price adjustment. For example, the customer may receive a price adjustment simply by committing to purchase the required product(s) 760 at a later date.

In order to indicate an interest in a product, to indicate an intent to purchase a product, or to request a purchase of a product, a customer may swipe an appropriate card bearing a magnetic strip through a card reading device located near the point of display of the product. A product identifier corresponding to the product and a customer identifier read from the magnetic strip are then associated in the storage device 160 of the retailer controller 100. Accordingly, a product identifier corresponding to each subsequently-selected product is also associated with the customer identifier in the data storage device 160. In this regard, each product may be assigned a separate card reading device designed to transmit to the retailer controller 100 only a product identifier corresponding to a single associated product, or the card reading device may have an additional input device which the customer uses to input a product identifier corresponding to a selected product or to input other information using which the product identifier may be determined.

As described above, price adjustment information for a transaction such as that shown in FIG. 7 may be stored in the customer device 202. In one embodiment, the customer device 202 may use the information to allow a customer to check out without interaction with the POS terminal 302. In this regard, it is assumed that each product with which the customer attempts to check out is represented in the price adjustment information. Accordingly, it may be determined whether required product(s) 760 associated with a price adjustment 750 are being purchased by reference to the listed product identifiers 730. A retailer may conduct random receipt audits at a retail store exit to ensure that the customer does not remove products other than those identified by the product identifiers 730.

In some embodiments, a total billed amount for certain products can differ depending solely on an order in which the certain products are selected by a customer. In other embodiments, price adjustments are determined so that a total amount billed does not depend upon an order of selection.

In an embodiment where a customer places products into a real or virtual shopping cart, the customer may be presented with a sale price for each product in the shopping cart or a total sale price of all products in the shopping cart. A sale price of a product in the shopping cart is determined based on a price adjustment associated with the product if all products required for the price adjustment are also in the shopping cart.

As a result, removal of a product from the shopping cart causes a sale price of the product to be removed from a list of sale prices presented to the customer or deducted from a total sale price presented to the customer. However, if the removed product is a required product associated with price adjustments for other products in the shopping cart, the removal may also result in an increase in sale prices listed for the other products and/or an increase in the total sale price.

In an example of the foregoing embodiment, a customer places a computer system having a retail price of $1000.00 into his shopping cart. Next, the customer indicates an interest in an inkjet printer by requesting information regarding the printer. In response, the customer is informed that a retail price of the printer is $200.00 and that he will receive a 50% discount off the retail price if the printer is purchased along with all other products currently in the shopping cart. The customer then places the printer in the shopping cart, and is presented with a total sale price of $1000.00+50%($200.00) =$1100.00. The customer may also or otherwise be presented with a list of sale prices for products in the shopping cart, the list including $1000.00 and $100.00. The customer then indicates an interest in a television and is informed that a retail price of $400.00 will be discounted to $350.00 if the television is purchased along with the printer. Once the television is added to the shopping cart, the customer is presented with a total sale price of $1100.00+$350.00=$1450.00 and/or a list including $1000.00, $100.00, and $350.00. If the customer then removes the computer system from the shopping cart, the customer is presented with a total sale price of $200.00+ $350.00=$550.00, and/or a list of sale prices including $200.00 and $350.00. Specifically, removal of the computer system causes an increase in a sale price of the printer because the computer system is a required product associated with a price adjustment for the printer. On the other hand, removal of the computer system does not cause an increase in a sale price of the television because the computer system is not a required product associated with a price adjustment for the television.

Although the present invention has been described with respect to particular embodiments, those skilled in the art will note that various substitutions and modifications may be made to those embodiments without departing from the spirit and scope of the present invention.

What is claimed is:

1. A method for selling products, comprising:
receiving, by a processing device, an indication of interest of a customer in a first product;
receiving, by the processing device, an indication of interest of the customer in a second product, in which the indication of interest in the second product comprises at least one of:
an indication that the customer is located in a retail store, physically near to the second product in the retail store,
an indication that the customer has viewed a representation of the second product for a period of time, and
a selection by the customer of the second product;
determining, by the processing device, a price adjustment for the second product based on the indication of interest of the customer in the first product; and
after receiving the indication of interest of the customer in the first product, after receiving the indication of interest of the customer in the second product, and before receiving from the customer a request to purchase the second product, transmitting, by the processing device, an indication of the price adjustment to the customer;
receiving, by the processing device and from the customer, a request to purchase the first product and the second product; and
charging, by the processing device, the customer for the second product based on the price adjustment.

2. A method comprising:
receiving, by a kiosk device in a retail store, an indication of interest of a customer in a first product;
receiving, by the kiosk device, an indication of a request by the customer for information regarding a second product, in which the request for information identifies the second product;
determining, by a processing device in communication with the kiosk device, a price adjustment for the second product based on the indication of interest of the customer in the first product; and
after receiving indication of interest of the customer in the first product, after receiving the indication of the request by the customer for information regarding the second product, and before receiving from the customer a request to purchase the second product, displaying, by the kiosk device, an indication of the price adjustment to the customer at the kiosk;
receiving, by the kiosk device and from the customer a request to purchase the first product and the second product; and
charging, by the kiosk device, the customer for the second product based on the price adjustment.

3. A method comprising:
offering a handheld device to a customer at a retail store;
receiving by the handheld device an indication of interest of the customer in a first product in the retail store;
receiving by the handheld device an indication of interest of the customer in a second product in the retail store, in which the indication of interest in the second product comprises one or more of the following:
a request for information regarding the second product, in which the request identifies the second product,
the customer scanning a bar code that is associated with the second product,
an indication that the customer is evaluating the second product in the retail store,
an indication that the customer is physically near the second product in the retail store, and
an indication that the customer is physically near the second product in the retail store for a predetermined amount of time;
determining by a processing device in communication with the handheld device, a price adjustment for the second product based on the indication of interest of the customer in the first product;
displaying, by at least one of the processing device and the handheld device and after the receiving of the indications of interest in the first and second products, the price adjustment to the customer;
receiving, by the handheld device and from the customer a request to purchase the first product and the second product; and
charging, by at least one of the processing device and the handheld device, the customer for the second product based on the price adjustment.

4. The method of claim 3, in which displaying comprises:
displaying the price adjustment to the customer via the handheld device.

5. The method of claim 3, in which displaying comprises:
displaying the price adjustment to the customer at a point-of-sale terminal in the retail store.

6. The method of claim 3, in which the handheld device comprises a personal digital assistant.

7. The method of claim 3, in which the handheld device comprises a bar-code scanner.

8. The method of claim 3, in which the indication of interest in the first product comprises the customer accepting the handheld device at the retail store.

9. The method of claim 3, in which the indication of interest in the first product comprises the customer scanning a bar code that is associated with the first product.

10. The method of claim 3, in which the indication of interest in the first product comprises an indication of a location of the customer in the retail store.

11. The method of claim 3, in which the indication of interest in the first product comprises an indication that the customer is evaluating the first product in the retail store.

12. The method of claim 3, in which the indication of interest in the first product comprises an indication that the customer is physically near the first product in the retail store.

13. The method of claim 3, in which the indication of interest in the first product comprises an indication that the customer is physically near the first product in the retail store for a predetermined amount of time.

* * * * *